US012698998B2

(12) United States Patent (10) Patent No.: US 12,698,998 B2

Ishikawa et al. (45) Date of Patent: Aug. 4, 2026

(54) LEVEL METER HAVING A RADIO WAVE TRANSMISSION UNIT AND A RADIO WAVE RECEPTION UNIT

(71) Applicant: Keyence Corporation, Osaka (JP)

(72) Inventors: Daishiro Ishikawa, Osaka (JP); Takahiro Ishii, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 330 days.

(21) Appl. No.: 18/605,916

(22) Filed: Mar. 15, 2024

(65) Prior Publication Data

US 2024/0361172 A1 Oct. 31, 2024

(30) Foreign Application Priority Data

Apr. 26, 2023 (JP) ................................. 2023-072441

(51) Int. Cl.
G01F 23/284 (2006.01)

(52) U.S. Cl.
CPC ................................ G01F 23/2845 (2013.01)

(58) Field of Classification Search
CPC .................................................. G01F 23/2845
See application file for complete search history.

(56) References Cited

U.S. PATENT DOCUMENTS

| | | | | | |
|---|---|---|---|---|---|
| 2024/0361170 | A1* | 10/2024 | Kanoda | ................. | G01F 23/284 |
| 2024/0361171 | A1* | 10/2024 | Tomoshi | ............... | G01F 23/284 |
| 2025/0102343 | A1* | 3/2025 | Otsu | ..................... | G01F 23/284 |
| 2025/0102344 | A1* | 3/2025 | Ishikawa | ................. | G01F 23/00 |
| 2025/0102345 | A1* | 3/2025 | Tomoshi | ............... | G01F 23/804 |
| 2025/0102346 | A1* | 3/2025 | Tomoshi | ................ | G01F 25/20 |
| 2025/0354851 | A1* | 11/2025 | Tomoshi | ............... | G01F 23/284 |

FOREIGN PATENT DOCUMENTS

| | | |
|---|---|---|
| JP | 2006078368 A | 3/2006 |
| JP | 2006078369 A | 3/2006 |
| JP | 2006078370 A | 3/2006 |
| JP | 2006078371 A | 3/2006 |
| JP | 2014002091 A | 1/2014 |
| JP | 2014006093 A | 1/2014 |
| JP | 2014006117 A | 1/2014 |

OTHER PUBLICATIONS

U.S. Appl. No. 18/605,908, filed Mar. 15, 2024 (54 pages).
U.S. Appl. No. 18/605,909, filed Mar. 15, 2024 (60 pages).

* cited by examiner

*Primary Examiner* — Eric S. McCall

(74) *Attorney, Agent, or Firm* — Kilyk & Bowersox, P.L.L.C.

(57) ABSTRACT

Provided is a level meter having a high degree of freedom in an installation place. The level meter includes a sensor unit and a controller that communicates with the sensor unit and supplies power. The sensor unit includes a signal generation unit that generates a transmission signal, a transmission unit that transmits a radio wave according to the generated transmission signal, a reception unit that receives the radio wave reflected by the object and generates a reception signal according to the received radio wave, and a sensor processing unit that measures a level of the object based on at least the reception signal. The controller includes a display unit that performs display according to the measured level and an operation unit for setting a parameter related to measurement of the level.

20 Claims, 13 Drawing Sheets

LEVEL METER HAVING A RADIO WAVE TRANSMISSION UNIT AND A RADIO WAVE RECEPTION UNIT

CROSS-REFERENCE TO RELATED APPLICATIONS

The present application claims foreign priority based on Japanese Patent Application No. 2023-072441, filed Apr. 26, 2023, the contents of which are incorporated herein by reference.

BACKGROUND OF THE INVENTION

1. Technical Field

The present invention relates to a level meter that measures a level of an object.

2. Description of the Related Art

In a container that stores a flowable substance such as a liquid, a powder, or a granular material, a level meter that measures a height of an interface of the substance, that is, a level (liquid level, powder upper surface level, etc.) may be used. Such a level meter has a function of displaying the measured level to the user.

For example, a level meter described in JP 2014-002091 A includes a display unit that displays a measured liquid level.

In the conventional level meter, the measured level is displayed as a numerical value. For example, in the level meter of JP 2014-002091 A, a 5-digit 7-segment LED (light emitting diode) for displaying the measurement result of the liquid level as a numerical value is provided on the display unit. The display unit is provided on the upper surface of the main body unit that generates a pulse signal used to measure the level.

However, since the display unit needs to display contents that the user can visually understand the measurement result, a certain size is required. In addition, in the level meter of JP 2014-002091 A, an operation unit for inputting measurement conditions and the like is also provided on the upper surface of the main body. Since the main body needs to include a display unit, an operation unit, and an electronic circuit for controlling the display unit and the operation unit, the main body has a large size. When the dimension of the main body of the level meter is large, the level meter cannot be installed in a narrow place, a place with a low ceiling, or the like, and the degree of freedom of the installation place decreases. In addition, since the display unit and the operation unit are at the same location as the main body, the user cannot confirm the measurement result or operate the operation unit unless approaching the level meter. Therefore, it is inconvenient to install the level meter in a place that is difficult for the user to approach, for example, a high place, and thus the degree of freedom of the installation place is low in the conventional level meter from the viewpoint of convenience for the user.

In view of the above problems, an object of the present invention is to provide a level meter having a high degree of freedom in installation place.

SUMMARY OF THE INVENTION

In order to solve the above problem, a level meter as an example of an embodiment according to the present invention is a level meter for measuring a level of an object, the level meter including: a sensor unit; and a controller that is connected to the sensor unit via a communication cable, communicates with the sensor unit, and supplies power to the sensor unit, in which the sensor unit includes: a signal generation unit that generates a transmission signal; a transmission unit that transmits a radio wave according to a transmission signal generated by the signal generation unit; a first housing that contains the transmission unit; an attachment portion formed in the first housing and configured to be attached toward an object; a measurement window provided in the first housing and configured to transmit a radio wave transmitted by the transmission unit; a reception unit that receives a radio wave reflected by the object through the measurement window and generates a reception signal corresponding to the received radio wave; and a sensor processing unit that measures the level of the object based on at least the reception signal generated by the reception unit, and the controller includes: a power supply that supplies power to the sensor unit via the communication cable; a second housing that contains the power supply; a display unit that is provided in the second housing and performs display according to the level measured by the sensor processing unit; and an operation unit that is provided in the second housing and configured to set a parameter related to measurement of the level. A level meter as another example of an embodiment according to the present invention is a level meter for measuring a level of an object, the level meter including: a signal generation unit that generates a transmission signal; a transmission unit that transmits a radio wave according to a transmission signal generated by the signal generation unit; a first housing that contains the transmission unit; an attachment portion formed in the first housing and configured to be attached toward an object; a measurement window provided in the first housing and configured to transmit a radio wave transmitted by the transmission unit; a dielectric lens that is disposed in the measurement window and refracts a transmission wave transmitted by the transmission unit such that the transmission wave travels along a measurement axis; a sensor board that is contained in the first housing, on which the transmission unit and the reception unit are mounted, and which intersects with the measurement axis; a communication cable that penetrates the first housing and is electrically connected to the sensor board; a reception unit that receives a radio wave reflected by the object through the measurement window and generates a reception signal corresponding to the received radio wave; and a sensor processing unit that measures a level of the object based on at least a reception signal generated by the reception unit.

According to the present invention, since the display unit and the operation unit are provided in the controller, the dimension of the sensor unit is reduced, and the degree of freedom of the installation place of the sensor unit is increased.

DETAILED DESCRIPTION

Hereinafter, a level meter 10 as an example of an embodiment according to the present invention will be described with reference to the drawings. In the perspective view of FIG. 1, the level meter 10 of the present embodiment is illustrated. The level meter 10 is a device that measures the level of an object to be measured (for example, liquid, powder, granular material, and the like). The measured level is the height of the interface of the object. Specific examples of the level include the height of the liquid level of the liquid contained in a container.

The level meter 10 includes a sensor unit 16 and a controller 55 capable of communicating with the sensor unit 16 at a position away from the sensor unit 16. The sensor unit 16 and the controller 55 are connected by a communication cable 11. The controller 55 communicates with the sensor unit 16 via the communication cable 11 and supplies power to the sensor unit 16.

Figure 1:
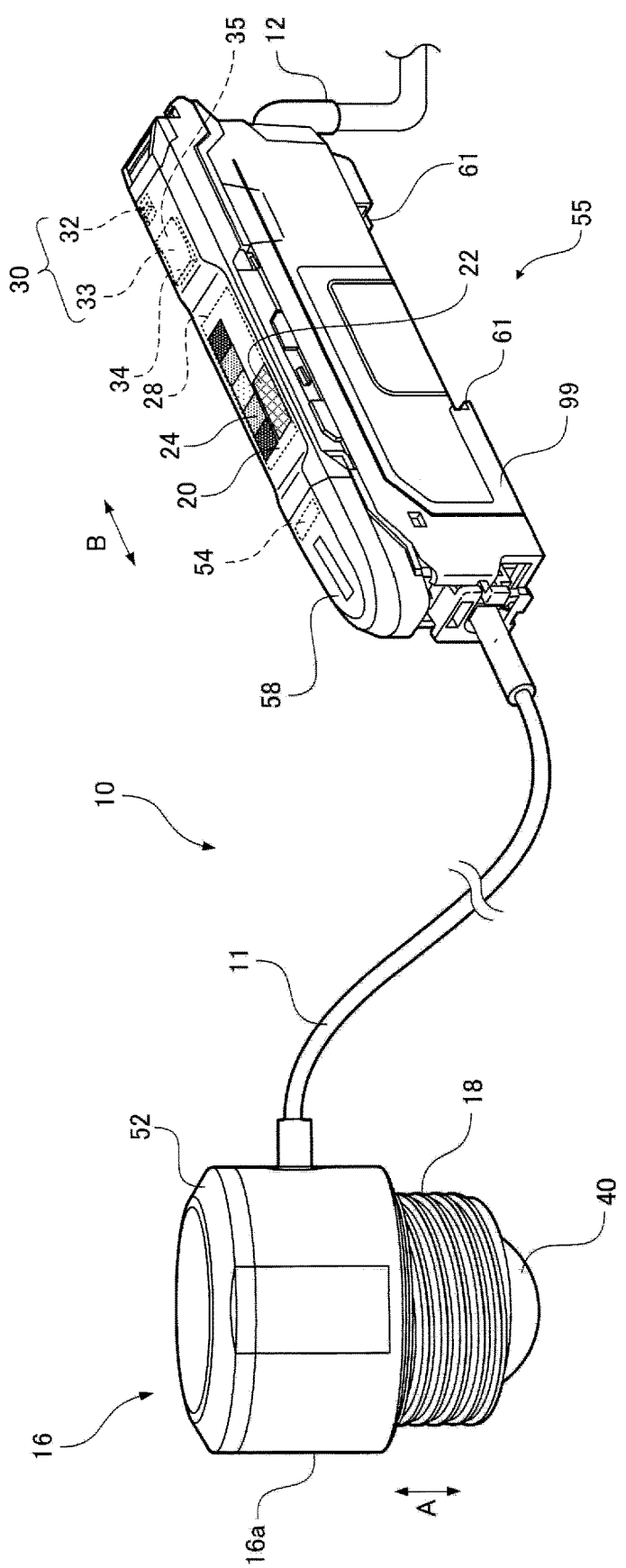
FIG. 1 is a perspective view illustrating a sensor unit and a controller of a level meter.

In the level meter 10 of FIG. 1, only the sensor unit 16 is attached to a container that contains an object 72, and the controller 55 communicates with the sensor unit 16 at a position away from the container. The sensor unit 16 is covered with a first housing 16a.

As illustrated in FIG. 1, the sensor unit 16 has a generally cylindrical shape. Hereinafter, a direction along a cylindrical axis of the sensor unit 16 is referred to as a longitudinal direction A. The first housing 16a of the sensor unit 16 in FIG. 1 is provided with a measurement window 40 at one end in the longitudinal direction A.

In the following description of the structure of the sensor unit 16, one end side in the longitudinal direction A may be referred to as a lower side, and the other end side in the longitudinal direction A may be referred to as an upper side. The sensor unit 16 measures the level of the object with the lower side in the longitudinal direction A facing the object. That is, the sensor unit 16 in FIG. 1 measures the level of the object in a state where the measurement window 40 of the first housing 16a is directed to the object. A measurement axis is set in the sensor unit 16 of FIG. 1. The sensor unit 16 measures the level along the measurement axis. Here, when the level meter 10 measures the level of the object, it is preferable that a change direction of the level of the object to be measured (for example, liquid such as water) and the longitudinal direction A are the same direction. That is, the direction of the measurement axis of the sensor unit 16 and the longitudinal direction A are preferably the same direction. For example, when the level meter 10 measures the height (level) of the liquid level of the liquid, the longitudinal direction A is preferably the same direction as the change direction of the height of the liquid level of the liquid, that is, the vertical direction (height direction, gravitation direction).

An attachment portion 18 for attaching the sensor unit 16 toward an object is formed above the measurement window 40 in the first housing 16a of the sensor unit 16. In order to measure the level of the object, the sensor unit 16 is attached to the attachment object using the attachment portion 18. For example, a container (tank) containing an object such as a liquid is an attachment object to which the sensor unit 16 is attached. The attachment object is not limited to the container, and may be any object to which the sensor unit 16 is attached. For example, a scaffold provided above an outdoor liquid level (lake level, sea level, etc.) can also be an attachment object. The attachment portion 18 in FIG. 1 has a cylindrical shape with a measurement axis of the sensor unit 16 as a cylindrical axis, and a thread is engraved on a surface of the cylinder. The upper side of the attachment portion 18 has a cylindrical shape having a diameter larger than that of the attachment portion 18. The sensor unit 16 in FIG. 1 is fixed to the container with the measurement window 40 facing the object by screwing the attachment portion 18 to the upper surface of the container that contains the object. Then, the state lamp 52 whose lighting state changes according to the measured level is disposed on the other end side (upper side) in the longitudinal direction A in the sensor unit 16. The state lamp 52 is disposed so as to surround a cylindrical axis of the sensor unit 16 parallel to the longitudinal direction A. The user can know the state of the object such as normal, caution, or abnormal by visually observing the lighting state of the state lamp 52.

In the level meter 10 of FIG. 1, a radio wave to be a transmission wave is transmitted from the measurement window 40 toward the object, and a reflected wave reflected by the object is received by the measurement window 40. The level meter 10 calculates the level of the object based on the transmission wave and the reflected wave.

The communication cable 11 is connected to a side surface of the first housing 16a of the cylindrical sensor unit 16. The communication cable 11 is connected to the controller 55 disposed at a position away from the sensor unit 16. The communication cable 11 transmits a signal between the sensor unit 16 and the controller 55. In addition, the communication cable 11 may transmit power from the controller 55 to the sensor unit 16. Here, the controller 55 is also referred to as a separate type controller. The length of the communication cable 11 is about several tens of centimeters to several tens of meters, and is typically about 1 meter to 5 meters.

The controller 55 in FIG. 1 is covered with a second housing 99. The second housing 99 has a box shape surrounded by six outer surfaces as a whole. Hereinafter, of the outer surfaces of the controller 55, the surface to which the communication cable 11 is connected is referred to as a front surface, and the surface on the opposite side is referred to as a rear surface. In FIG. 1, a surface on the upper side of the controller 55 is referred to as an upper surface, a surface on the lower side is referred to as a lower surface, a surface on the front side is referred to as a left side surface, and a surface opposite to the left side surface is referred to as a right side surface. In the following description of the structure of the controller 55, a direction connecting the front surface and the rear surface is referred to as a front-rear direction B.

A display unit 20 is provided on the upper surface of the second housing 99 of the controller 55. The display unit 20 includes an active matrix type display device capable of displaying various types of information. For example, the display unit 20 includes a liquid crystal display (LCD). In particular, the display unit 20 preferably includes an LCD capable of color display (display with a plurality of colors).

The display unit 20 displays the level of the object measured by the sensor unit 16. In FIG. 1, a bar graph 22 whose length expands and contracts according to the value of the level is displayed on the display unit 20. The display unit 20 also displays a gauge 24 divided into a plurality of sections. The gauge 24 indicates which level range the measured level belongs to among a plurality of predetermined level ranges. It is preferable that the gauge 24 is color-displayed (multi-color display), and each section is color-coded. However, the gauge 24 may be displayed in a single color as long as each section can be distinguished. For example, a line indicating separators of the sections may be displayed. Alternatively, each section may be divided according to color shading. The bar graph 22 is displayed next to the gauge 24.

An operation unit 30 is also disposed on an outer surface (upper surface) of the second housing 99 of the controller 55 on which the display unit 20 is disposed. The operation unit 30 of FIG. 1 includes a setting key 32 and a direction key 33. The direction key 33 includes an up key 34 and a down key 35. The user of the level meter 10 can operate the operation parameter of the level meter 10 by operating the operation unit 30. The operation parameter includes a parameter related to level measurement. The operation parameter includes, for example, a threshold to be compared with the level of the object measured by the sensor unit 16. In particular, the user can change the setting of the threshold that defines the display content of the display unit 20 and the separator of the level range by operating the operation unit 30. In addition, the user may change the color of light emitted by the state lamp 52 of the sensor unit 16 by operating the operation unit 30. Each of the plurality of level ranges divided by the threshold is associated with a color, and the state lamp 52 of the sensor unit 16 emits light in a color corresponding to the level range to which the measured level belongs. Furthermore, the operation unit 30 receives a color setting operation corresponding to a plurality of level ranges for the level. Then, for example, the user can change the color emitted by the state lamp 52 by operating the operation unit 30 to change the color corresponding to the level range. Note that the operation unit 30 only needs to cause the controller 55 to receive a user's operation, and may be, for example, a touch panel integrated with the display unit 20. A second state lamp 54 is also provided on the upper surface of the controller 55. The second state lamp 54 is lit in the same lighting state as the state lamp 52 of the sensor unit 16.

Above the display unit 20, the operation unit 30, and the second state lamp 54 provided in the controller 55, a transparent upper surface cover 58 that covers the display unit 20, the operation unit 30, and the second state lamp 54 is provided. The upper surface cover 58 is made of an optically transparent material such as glass, acrylic, polyarylate, or polycarbonate. The user can confirm the display content of the display unit 20 and the lighting state of the second state lamp 54 through the upper surface cover 58. When the user operates the operation unit 30, the user temporarily removes the upper surface cover 58 from above the operation unit 30. The upper surface cover 58 may be attached to the controller 55 via a hinge to facilitate temporary removal and attachment of the upper surface cover 58.

A connection portion 12 is provided on a rear surface of the controller 55. The connection portion 12 of FIG. 1 is a terminal to which a cable for performing communication between the controller 55 and an external device is connected.

A rail holder portion 61 is provided on a lower surface of the controller 55. The rail holder portion 61 has a structure in which a rail not illustrated in FIG. 1 is sandwiched, and the rail holder portion 61 sandwiches the rail, whereby the controller 55 is attached to the rail.

As illustrated in FIG. 1, the level meter 10 includes the controller 55 that can communicate with the sensor unit 16 at a position away from the sensor unit 16, separately from the sensor unit 16 that transmits and receives a radio wave for measuring the level of the object. Since the controller 55 includes the display unit 20 and the operation unit 30, the sensor unit 16 does not need the display unit 20 and the operation unit 30. Therefore, the dimension of the sensor unit 16 is reduced, and the degree of freedom of the installation place of the sensor unit 16 is increased. In addition, since the display unit 20 and the operation unit 30 are in the controller 55 at a position away from the sensor unit 16, the user does not need to approach the sensor unit 16 when checking the display on the display unit 20 and when operating the operation unit 30. Therefore, even if the sensor unit 16 is installed at a place that is difficult for the user to approach, the convenience of the user is not impaired, so that the degree of freedom of the installation place of the sensor unit 16 is increased.

Figure 2:
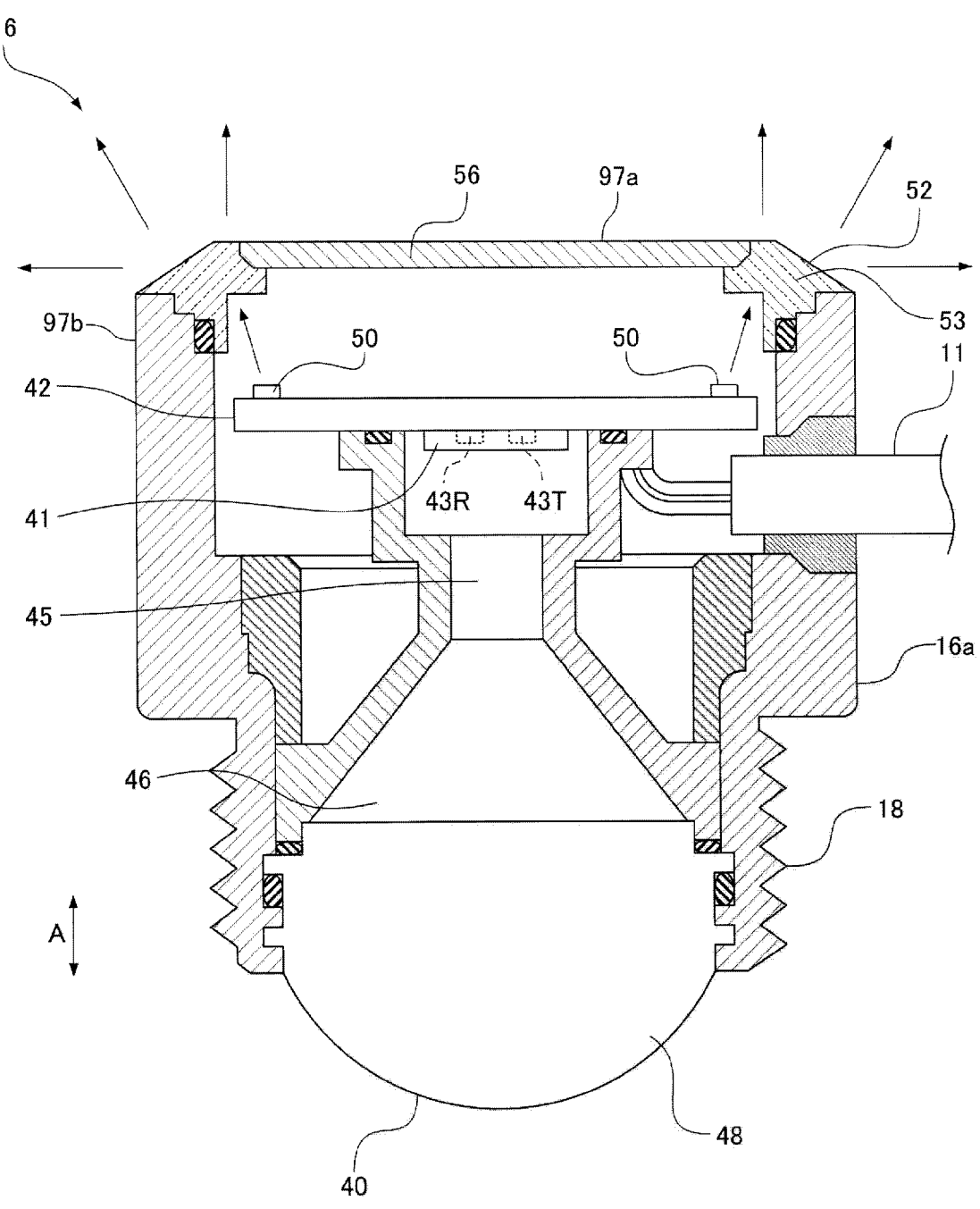
FIG. 2 is a cross-sectional view of the sensor unit.

Next, an internal structure of the sensor unit 16 will be described with reference to FIG. 2. FIG. 2 is a cross-sectional view illustrating a cross section of cylindrical sensor unit 16 in a plane including an axial center of the cylindrical shape.

An outer surface of the sensor unit 16 is covered with the first housing 16a. A sensor IC 41 (IC: Integrated circuit) and a sensor board 42 supporting the sensor IC 41 are disposed inside the first housing 16a. The sensor IC 41 performs transmission and reception of radio waves and signal processing for measuring the level of the object. A communication cable 11 is connected to the sensor board 42, and a signal processed by the sensor IC 41 is transmitted to the controller 55 via the communication cable 11. The communication cable 11 penetrates the first housing 16a and is electrically connected to the sensor board 42 (electronic circuit board).

As the sensor IC 41, for example, MMIC (Monolithic Microwave Integrated Circuit) is used. The MMIC is an IC in which a plurality of semiconductor components that perform transmission of radio waves, reception of radio waves, signal processing based on transmitted and received radio waves, and the like are integrated into a single semiconductor device (one chip). In the sensor IC 41 of FIG. 2, an antenna is integrated with the MMIC by using an antenna in package (AiP) technology or an antenna on package (AoP) technology. That is, in FIG. 2, the sensor IC 41 is an antenna-integrated package (antenna on package) in which a transmission unit that transmits a radio wave and a reception unit that receives a radio wave are integrated in a single semiconductor device. Since the antenna-integrated MMIC is used as the sensor IC 41, the volume occupied by the configuration for transmitting and receiving radio waves is reduced, and the entire dimension of the sensor unit 16 becomes compact. Note that the sensor IC 41 is not limited to the antenna-integrated MMIC alone, and may include a plurality of ICs. The sensor IC 41 may include, for example, an antenna-integrated MMIC and a microcomputer. Then, the antenna-integrated MMIC may include a radio wave transmission antenna, a radio wave reception antenna, and a circuit that executes radio wave transmission/reception control, and the microcomputer may include a circuit that executes signal processing or arithmetic processing based on a reception signal received from the antenna-integrated MMIC.

The sensor IC 41 is mounted on the lower surface of the sensor board 42. The sensor board 42 is an electronic circuit board in which various electronic circuit elements are arranged on a plate made of an insulator such as glass or resin. In FIG. 2, the sensor board 42 is disposed in a direction orthogonal to the longitudinal direction A (horizontal direction in FIG. 2). In a case where the sensor IC 41 is an antenna-integrated MMIC, the sensor IC 41 includes a transmission unit 43T that transmits a radio wave and a reception unit 43R that receives a radio wave. Since the sensor IC 41 includes the transmission unit 43T and the reception unit 43R, the sensor unit 16 includes the transmission unit 43T and the reception unit 43R. By mounting the sensor IC 41 on the lower surface of the sensor board 42, the transmission unit 43T and the reception unit 43R are arranged on the lower surface (one end side in the longitudinal direction A) of the sensor board 42.

The measurement window 40 is located below the sensor board 42. The measurement window 40 of FIG. 2 includes a waveguide 45, a tapered wall 46, and a dielectric lens 48 as internal structures. In a case where the sensor IC 41 is an antenna-integrated MMIC, a radio wave serving as a transmission wave is transmitted from the sensor IC 41. The transmission wave transmitted from the sensor IC 41 is guided toward the object through the waveguide 45, the tapered wall 46, and the dielectric lens 48 in this order. The reflected wave reflected by the object and incident on the measurement window 40 is guided toward the sensor IC 41 through the dielectric lens 48, the tapered wall 46, and the waveguide 45 in this order. The attachment portion 18 is provided below the sensor unit 16. The attachment portion 18 may be provided on the lower outer periphery of the first housing 16a. When the attachment portion 18 on the lower side of the first housing 16a has a cylindrical shape, a cross section thereof has a circular shape. In this case, the circular dielectric lens 48 can be disposed on the lower side (one end side in the longitudinal direction A) of the cylindrical attachment portion 18. When the dielectric lens 48 is disposed in the attachment portion 18, the attachment portion 18 having a cylindrical shape with the measurement axis of the sensor unit 16 as a cylindrical axis surrounds the side surface of the dielectric lens 48. That is, when the sensor unit 16 has a cylindrical portion on the lower side, the cylindrical portion can serve as both the attachment portion 18 to be attached to an installation target (such as a tank) of the sensor unit 16 and an arrangement place of the dielectric lens 48, and the entire dimension of the level meter 10 becomes compact. Since the dielectric lens 48 is provided on the lower side of the sensor unit 16, the transmission unit 43T and the reception unit 43R of the sensor IC 41 mounted on the lower surface of the sensor board 42 are mounted on the surface facing the dielectric lens 48. In FIG. 2, the transmission unit 43T and the reception unit 43R are mounted on a central portion of a surface of the sensor board 42 facing the dielectric lens 48.

On an upper surface (the other end side in the longitudinal direction A) of the sensor board 42, a state LED 50 (light emitting diode) serving as a light source of the state lamp 52 is disposed. The state lamp 52 includes a plurality of state LEDs 50 and a transmission window 53 including a member (such as a light diffusion film) that diffuses light. The lighting state of the state LED 50 changes according to the level of the object measured by the sensor unit 16. The disc-shaped lid 56 and the transmission window 53 are disposed above the state LED 50. The axis of the disc-shaped lid 56 is parallel to the longitudinal direction A. The transmission window 53 transmits light from the state LED 50 serving as a light source. The transmission window 53 is disposed on the outer periphery of the lid 56 so as to surround the axis of the lid 56 parallel to the longitudinal direction A. Specifically, the transmission window 53 is provided between a first surface 97a and a second surface 97b of the first housing 16a of the sensor unit 16. Here, in FIG. 2, the first housing 16a of the sensor unit 16 also has a cylindrical portion with the measurement axis as a cylindrical axis on the upper side of the attachment portion 18. The first surface 97a is a surface passing through the cylindrical measurement axis, and the second surface 97b is a cylindrical side surface. In addition, it is preferable that a plurality of state LEDs 50 are arranged at intervals along a circumferential direction around an axis parallel to the longitudinal direction A. The state LED 50 serving as a light source of the state lamp 52 is mounted on a back surface of a surface of the sensor board 42 facing the dielectric lens 48. The state LED 50 may be mounted on a peripheral portion of a surface facing the dielectric lens 48.

The light emitted from the state LED 50 is diffused through the transmission window 53 (transmitted) in a direction intersecting the longitudinal direction A, and guided to the outside of the sensor unit 16. Therefore, as the lighting state of the state LED 50 changes according to the level of the object, the lighting state of the state lamp 52 changes. In addition, since the transmission window 53 including a member that diffuses light is arranged so as to surround the axis parallel to the longitudinal direction A, the light emitted from the state LED 50 is uniformly diffused in all directions around the sensor unit 16. Each of the state LEDs 50 may emit light in a single color (for example, red, yellow, green, and the like) or may emit light by switching a plurality of colors (for example, red, yellow, green, and the like). When the state LED 50 emits light by switching a plurality of colors, a plurality of light emitting elements that emit light in different colors may be included in one LED, or a combination of a plurality of LEDs that emit light in different colors may be arranged as the state LED 50. Then, the state LED 50 may emit light by mixing a plurality of colors. In addition, the state LED 50 may emit light in a color corresponding to the gauge 24 displayed in color. For example, when the state LED 50 emits light by switching a plurality of colors, the state LED 50 may emit light in a color corresponding to the color of the section of the gauge 24 corresponding to the level range to which the measured level belongs. In addition, each of the state LEDs 50 is preferably capable of switching among a non-light emitting state (light-off state), a light emitting state, and a blinking state. Note that the light source of the state lamp 52 may be any light source as long as the light source can control the lighting state, and may be, for example, a light emitting element using organic electro luminescence (EL).

The state LED 50, which is a light source of the state lamp 52, is disposed near the upper end (the other end in the longitudinal direction A) inside the sensor unit 16. The transmission window 53 of the state lamp 52 is disposed above the state LED 50, specifically, on the outer periphery of the upper end of the sensor unit 16. The transmission window 53 has a tapered surface inclined with respect to the longitudinal direction A, and the light emitted from the state LED 50 is emitted (transmitted) from the tapered surface of the transmission window 53 to the outside of the housing 15.

Further, the transmission window 53 includes a member that diffuses light. A specific example of the member that diffuses light included in the transmission window 53 is a member in which materials having different refractive indexes are combined. For example, transparent fine particles (for example, acrylic resin) having a refractive index different from that of the base material may be added to the surface or the inside of the base material made of a transparent material such as polyethylene terephthalate (PET) resin. When light is incident on the transmission window 53 formed of such a member, the light is refracted in a complicated path due to a difference in refractive index between the base material and the fine particles, and the light emitted from the transmission window 53 is diffused in various directions. Therefore, in combination with the fact that the transmission window 53 has the tapered surface, the light emitted from the transmission window 53 is diffused in the direction intersecting the longitudinal direction A even when the state LED 50 is disposed in the direction parallel to the longitudinal direction A. Note that it is sufficient that at least a part of the light emitted from the transmission window 53 is in a direction intersecting the longitudinal direction A, and the light emitted from the transmission window 53 may include light in a direction parallel to the longitudinal direction A.

By diffusing the light emitted from the transmission window 53 in the direction intersecting the longitudinal direction A, the light of the state lamp 52 can be visually recognized from the direction intersecting the longitudinal direction A (for example, the horizontal direction orthogonal to the longitudinal direction A). Therefore, the user can easily visually grasp the lighting state of the state lamp 52 even at a position away from the sensor unit 16 attached to the container. In addition, the light of the state LED 50 is diffused by the transmission window 53 including a member that diffuses light, so that the light of the state LED 50, which is a point light source, is irradiated in all directions. Therefore, the user can easily visually grasp the state of the level of the object from any direction with respect to the sensor unit 16.

Figure 3:
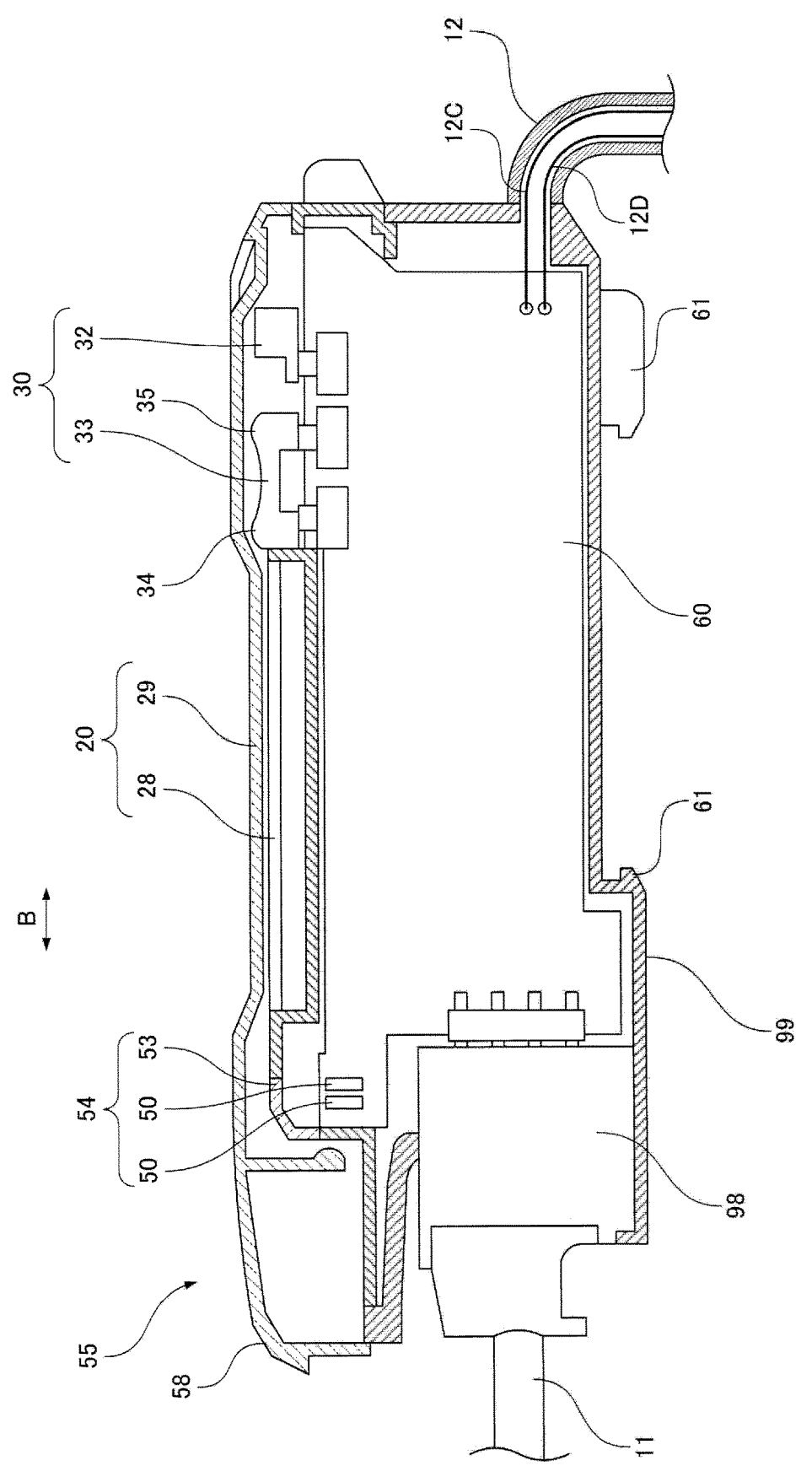
FIG. 3 is a cross-sectional view of a controller.

Next, an internal structure of the controller 55 will be described with reference to FIG. 3. FIG. 3 is a cross-sectional view illustrating a cross section of the controller 55 in a plane parallel to the left side surface and the right side surface.

An outer surface of the controller 55 is covered with the second housing 99. A power supply 98 and a control board 60 are accommodated in the second housing 99. The control board 60 is an electronic circuit board in which various electronic circuit elements are arranged on a plate made of an insulator such as glass or resin. The control board 60 is disposed so as to be parallel to the left side surface and the right side surface of the controller 55 (parallel to the paper surface in FIG. 3). The power supply 98, the connection portion 12, the display unit 20, the operation unit 30, and the second state lamp 54 are connected to the control board 60. The power supply 98 is a unit that supplies power to the sensor unit 16 via the communication cable 11. The power supply 98 only needs to be able to supply power to the sensor unit 16, and is not limited to a unit that generates power such as a battery. The power supply 98 may be, for example, a unit including an electronic component that temporarily stores power such as a capacitor, or a unit that relays power supplied from the outside.

A signal processing circuit for receiving a user's operation on the operation unit 30 and a signal processing circuit for controlling the display unit 20 and the second state lamp 54 are mounted on the control board 60. The control board 60 receives a signal from the sensor IC 41 of the sensor unit 16 via the communication cable 11, and performs signal processing for displaying the level of the object measured by the sensor unit 16 on the display unit 20.

In FIG. 3, the communication cable 11 is connected to the power supply 98 from the front surface side (one end side in the front-rear direction B, left side in the drawing) of the controller 55. The power supply 98 is connected to the control board 60 via a connector. In FIG. 3, the connection portion 12 is provided on the rear surface side (other end side in the front-rear direction B, right side in the drawing) of the controller 55. The connection portion 12 in FIG. 3 is a cable connected to the rear surface side of the controller 55. The connection portion 12 includes an external input terminal 12C and an external output terminal 12D serving as connection terminals with an external device. The external input terminal 12C is a terminal for inputting a signal or power, or both, from the outside to the level meter 10. The external output terminal 12D is a terminal for outputting a signal from level meter 10 to the outside. The external input terminal 12C and the external output terminal 12D are connected to the control board 60. A signal or power input from the outside through the external input terminal 12C is input to the control board 60. The signal generated by the control board 60 can be output to the outside through the external output terminal 12D.

The operation unit 30 of FIG. 3 is provided on the rear surface side of the display unit 20 on the upper surface of the controller 55. Terminals of electronic components (for example, tactile switches) constituting the keys of the operation unit 30, that is, the setting key 32 and the direction key 33 (the up key 34 and the down key 35) are connected to the control board 60.

The display unit 20 in FIG. 3 includes a display device 28 and a transparent display window 29. The display device 28 is, for example, an LCD, particularly an LCD capable of color display. The display window 29 is a part of the upper surface cover 58 made of an optically transparent material such as glass or acrylic, and optically transmits the display content of the display device 28 to the outside of the controller 55. In FIG. 3, the display device 28 and the display window 29 are directed parallel to the front-rear direction B.

The second state lamp 54 of FIG. 3 is provided on the front surface side of the display unit 20 on the upper surface of the controller 55. A plurality of state LEDs 50 serving as light sources (second light sources) of the second state lamp 54 are mounted on the control board 60, and a second transmission window 53a that transmits light of the state LEDs 50 is provided above the state LEDs 50. The emission colors of the plurality of state LEDs 50 are preferably different colors (for example, red and green). In addition, it is preferable that the plurality of state LEDs 50 can individually switch between light emission and light extinction. The display state of the second state lamp 54 is changed by switching the light emission state, the light-off state, the blinking state, the emission color, and the like of the state LED 50.

A rail holder portion 61 for attaching the controller 55 to the rail is provided on a lower surface of the controller 55 in FIG. 3. The rail holder portion 61 includes two claw portions separated in the front-rear direction B. The two claw portions have a structure in which lower end portions protrude toward each other in the front-rear direction B.

Figure 4:
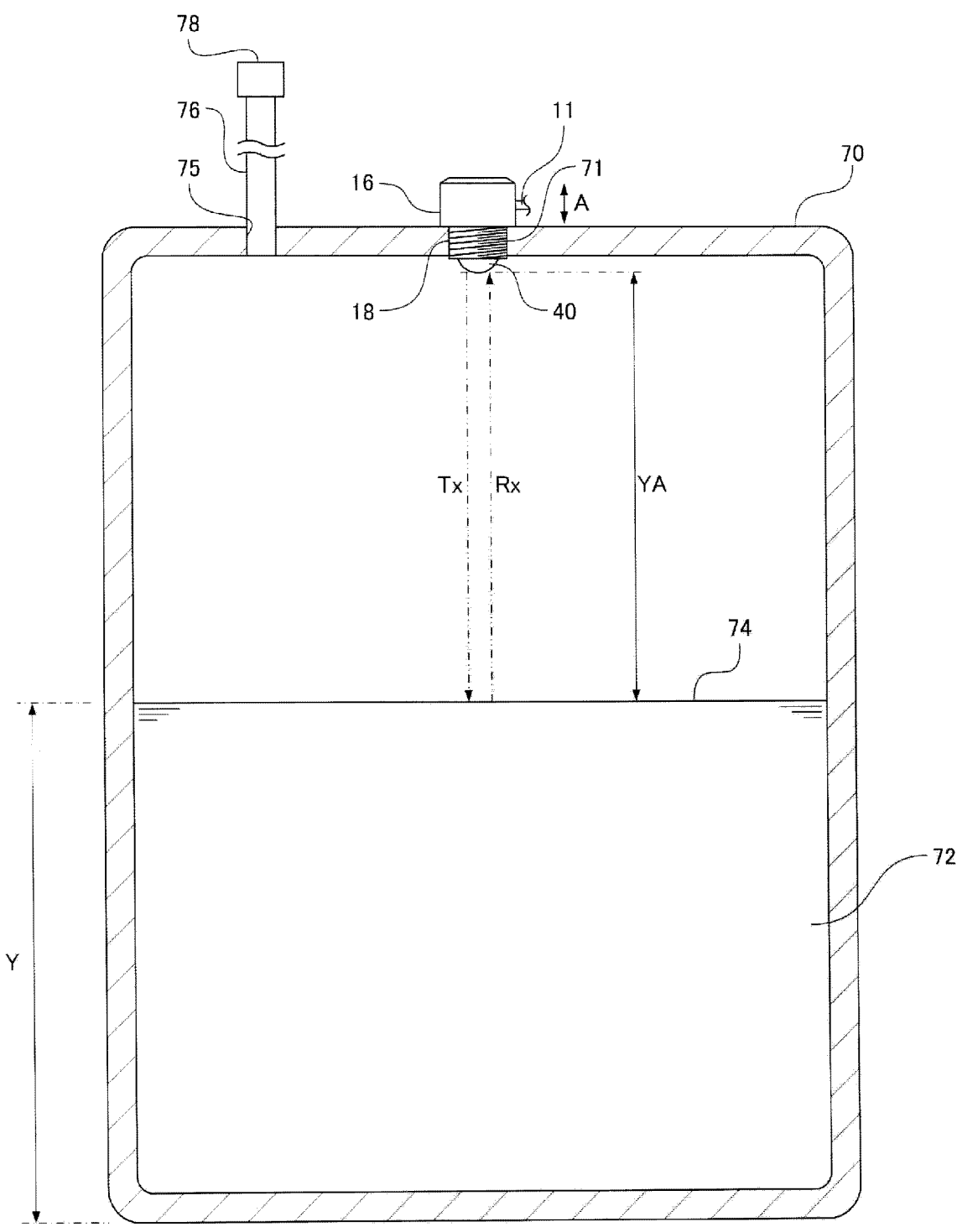
FIG. 4 is a view illustrating a state in which the sensor unit is attached to a tank that contains an object.

Next, an example of a use state of the level meter 10 will be described with reference to FIG. 4. FIG. 4 is a view illustrating a state in which the sensor unit 16 of the level meter 10 is attached to the tank 70 that contains the object 72. The object 72 is, for example, a liquid such as water, and a level Y of the object 72 is a height from the bottom of the tank 70 to an interface 74 (liquid level) of the object 72.

The tank 70 contains water to be the object 72 in, for example, a water treatment facility. For example, when the object 72 in the tank 70 is supplied to a water treatment process or the like, the level Y of the object 72 in the tank 70 decreases. In addition, as the tank 70 is replenished with the object 72, the level Y of the object 72 in the tank 70 increases. For example, a water injection port 75 is provided in an outer wall (an upper wall in FIG. 4) of the tank 70. A water injection pipe 76 is fluidly connected to the tank 70 via the water injection port 75. The water injection pipe 76 is connected to a water injection device 78 (device including, for example, a pump, a valve or the like) provided outside the tank 70. The water injection device 78 is a device that supplies (injects) the object 72 from the outside of the tank 70 into the tank 70. The water injection device 78 adjusts the amount of water injected into the tank 70 according to the level Y of the object 72 in the tank 70. In addition, the water injection device 78 stops the water pouring depending on the level Y of the object 72 in the tank 70. The water injection device 78 controls the replenishment of the object 72 to the tank 70 according to the level Y of the object 72 in the tank 70 such that the level Y of the object 72 in the tank 70, which decreases as the object 72 is consumed, for example, by the water treatment process, falls within a predetermined range.

The sensor unit 16 in FIG. 4 is attached to the upper side of the tank 70. An attachment hole 71 is provided above the tank 70. The attachment hole 71 is a screw hole, and the sensor unit 16 is attached to the tank 70 (attachment object) by screwing the attachment portion 18 of the sensor unit 16 to the attachment hole 71. Note that the method of attaching the sensor unit 16 to the tank 70 is not limited to screwing using the attachment portion 18, and a thread may not be formed on the outer peripheral surface of the attachment portion 18. For example, one or both of the sensor unit 16 and the tank 70 may be provided with a flange, and the sensor unit 16 may be attached to the tank 70 by fixing the flange to the sensor unit 16 or the tank 70 with a bolt.

In FIG. 4, the longitudinal direction A of the sensor unit 16 in a state of being attached to the tank 70 is the same direction as the change direction of the level Y of the object 72. The sensor unit 16 transmits a radio wave to be the transmission wave Tx from the measurement window 40 toward the object 72. Then, a reflected wave Rx resulting from reflection of the transmission wave Tx at the interface 74 of the object 72 is received by the measurement window 40. The sensor unit 16 calculates the level Y of the object 72 based on the transmission wave Tx and the reflected wave Rx. For example, in the case of performing the measurement using the time of flight (ToF) method, the sensor unit 16 calculates a distance YA from the measurement window 40 to the interface 74 based on the difference between the transmission timing of the transmission wave Tx and the transmission timing of the reflected wave Rx, and calculates the level Y based on the distance YA. In addition, for example, in a case where measurement is performed by a radar method using a frequency modulated continuous wave (FMCW), the level meter 10 calculates the distance YA from the measurement window 40 to the interface 74 based on a frequency of a waveform obtained by mixing the transmission wave Tx and the reflected wave Rx, and calculates the level Y based on the distance YA.

Measurement data indicating the level Y of the object 72 measured by the sensor unit 16 is transmitted to the controller 55 not illustrated in FIG. 4 via the communication cable 11. The controller 55 outputs an analog signal indicating the level Y of the object 72 measured based on the measurement data or a control signal based on a comparison result between the level Y of the object 72 measured by the sensor unit 16 and a threshold to an external control device (not illustrated) such as a programmable controller that performs control. The external control device controls the operation of the water injection device 78 according to the measured level Y or the comparison result between the level Y and the threshold.

Figure 5A:
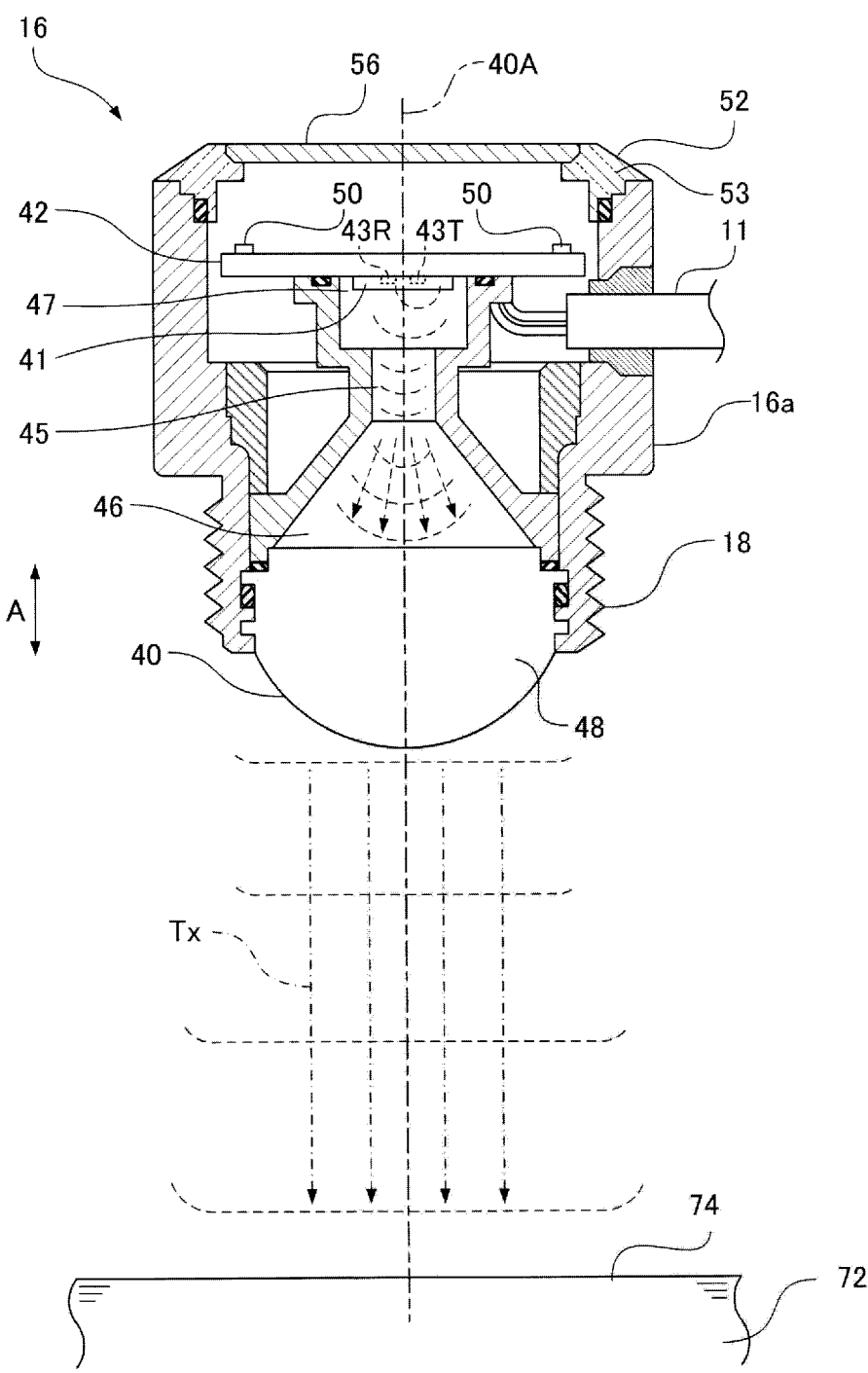
FIG. 5A is a view illustrating a traveling path of a transmission wave.
Figure 5B:
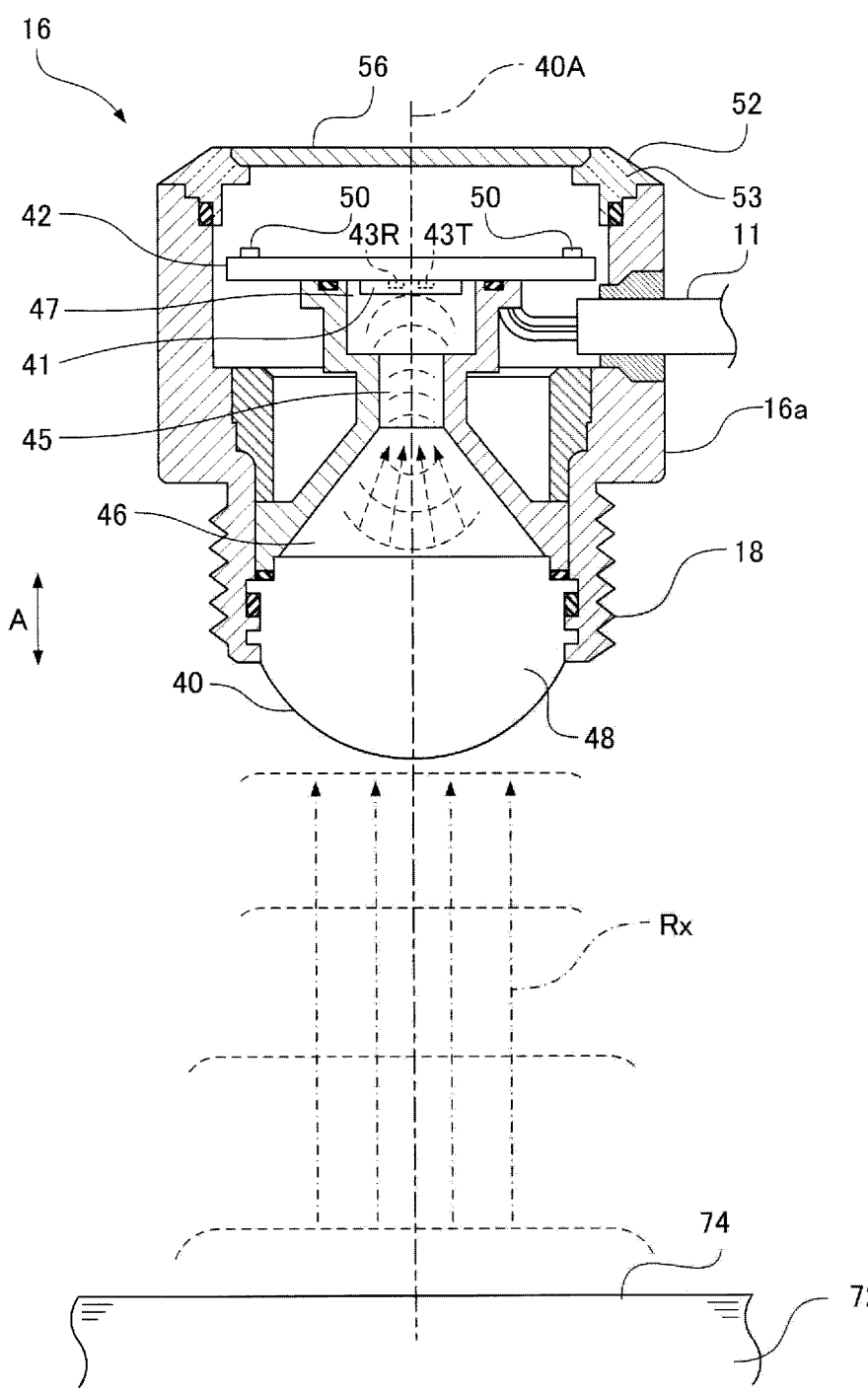
FIG. 5B is a view illustrating a traveling path of a reflected wave.

FIG. 5A is a view illustrating a traveling path of transmission wave Tx. FIG. 5B is a view illustrating a traveling path of the reflected wave Rx. Referring to FIGS. 5A and 5B, the transmission wave Tx is guided to the object 72 through the tapered wall 46 and the dielectric lens 48, and the reflected wave Rx is guided to a reception unit 43R.

The sensor unit 16 includes a transmission unit 43T that transmits the transmission wave Tx and a reception unit 43R that receives the reflected wave Rx. Specifically, the sensor IC 41 disposed inside the sensor unit 16 includes the transmission unit 43T and the reception unit 43R. The transmission unit 43T and the reception unit 43R are a semiconductor electromagnetic wave generating device and a semiconductor electromagnetic wave receiving device mounted on a chip of the sensor IC 41, respectively. The sensor IC 41 including the transmission unit 43T and the reception unit 43R is contained in the first housing 16a and mounted on the sensor board 42 intersecting a measurement axis 40A of the sensor unit 16.

The measurement window 40 of the sensor unit 16 is located between the transmission unit 43T and the object 72. The measurement window 40 may be provided with a conductive radio wave shaping unit including the waveguide 45 that surrounds a space that the transmission unit 43T and the reception unit 43R on the sensor board 42 face (contact) and forms a waveguide along the measurement axis 40A communicating with the enclosed space. The radio wave shaping unit may further include a conductive tapered wall 46 surrounding a space communicating with the waveguide. For example, in FIGS. 5A and 5B, the surrounding wall 47, the waveguide 45, the tapered wall 46, and the dielectric lens 48 are provided in order of proximity to the transmission unit 43T. The surrounding wall 47 surrounds a space that the transmission unit 43T and the reception unit 43R on the sensor board 42 face and communicates with the waveguide 45. The surrounding wall 47 has conductivity. A radio wave absorber that absorbs radio waves may be provided on the inner wall surface of the surrounding wall 47. The waveguide 45 is a hollow pipe formed of a conductive conductor. The tapered wall 46 communicates with the waveguide of the waveguide 45, and forms a radio wave path extending from the waveguide toward the dielectric lens 48 in a direction orthogonal to the measurement axis 40A. The tapered wall 46 has conductivity, and a radio wave absorber that absorbs radio waves may be provided on an inner wall surface thereof. These are arranged such that the directions of the directivities of the waveguide 45 and the tapered wall 46 coincide with the measurement axis 40A of the dielectric lens 48. In FIG. 5, the measurement window 40 is disposed such that the measurement axis 40A is parallel to the longitudinal direction A of the sensor unit 16. Hereinafter, the directions of the directivities of the waveguide 45 and the tapered wall 46 may also be referred to as the measurement axis 40A.

Although the transmission wave Tx transmitted from the transmission unit 43T includes components directed in various directions, only the component directed in the direction of the object 72 passes through the space in the surrounding wall 47 and the waveguide 45, and then enters the dielectric lens 48 via the tapered wall 46. In FIGS. 5A and 5B, the equiphase surface of the radio wave is indicated by a broken line in the surrounding wall 47, the tapered wall 46, and below the measurement window 40. Note that, in the waveguide 45, the equiphase surface should originally be shown linearly, but in order to make the traveling direction of the radio wave easy to understand, a curved broken line bulging toward the traveling direction side (lower side in FIG. 5A, upper side in FIG. 5B) is shown in the drawing. The waveguide 45 converts the transmission wave Tx such that the transmission wave Tx becomes a spherical wave traveling in a spherical shape along the measurement axis 40A from the emission end of the waveguide 45 regardless of the relative positional relationship between the transmission unit 43T and the waveguide 45. As a result, the emission end of the waveguide 45 can be regarded as a dot-liked transmission source. The diameter of the waveguide 45 may be set to a diameter that allows only the radio wave in the fundamental mode to pass through the waveguide 45 so that the emission end of the waveguide 45 becomes an ideal dot-like transmission source. On the other hand, when the diameter of the waveguide 45 is smaller than half the wavelength of the radio wave, the radio wave does not pass through the waveguide 45. Therefore, the diameter (dimension in the direction orthogonal to the measurement axis 40A) of the waveguide 45 forming the waveguide is preferably longer than half the wavelength of the transmission wave Tx and shorter than the wavelength of the transmission wave Tx. For example, when the frequency of the radio wave is 50 GHz to 70 GHz, the wavelength is about 4.3 mm to about 6.0 mm, and the half wavelength is about 2.15 mm to about 3.0 mm. In this case, when a diameter larger than 3 mm and smaller than 4.3 mm is selected as the diameter of the waveguide 45, only the radio wave in the fundamental mode can pass through the waveguide 45. The diameter of the waveguide 45 satisfying the above condition is, for example, 4 mm. When the dimension of the waveguide 45 in the direction along the measurement axis 40A is short, even if the diameter of the waveguide 45 satisfies the above condition, radio waves other than the fundamental mode also pass through the waveguide 45. For example, the dimension of the waveguide 45 in the direction along the measurement axis 40A (the length of the waveguide in the direction along the measurement axis 40A) is preferably set to a length corresponding to one wavelength or more of the wavelength of the radio wave. Note that the longer the dimension of the waveguide 45 in the direction along the measurement axis 40A, the longer the dimension of the sensor unit 16 in the longitudinal direction A. After passing through the waveguide 45, the transmission wave Tx travels as a spherical wave in the tapered wall 46, and is refracted by the dielectric lens 48 so as to travel as a plane wave along the measurement axis 40A. The tapered wall 46 may be formed of a conductor, and a layer that absorbs radio waves may be formed on the inner wall surface. When the layer that absorbs radio waves is formed on the inner wall surface of the tapered wall 46, radio waves passing through the tapered wall 46 are blocked, and unnecessary reflection on the inner wall surface, the end surface of the dielectric lens 48, and the like can be reduced.

As illustrated in FIG. 5A, the transmission wave Tx travels as a spherical wave in the tapered wall 46, and thereafter, the transmission wave Tx incident on the dielectric lens 48 is refracted between the tapered wall 46 and the dielectric lens 48 and between the dielectric lens 48 and the ambient air (atmosphere), and is guided in a direction parallel to the measurement axis 40A along the direction in which the sensor unit 16 measures the level. Since the measurement axis 40A is parallel to the longitudinal direction A, the transmission wave Tx is guided in a direction in which one end (lower side) of the sensor unit 16 in the longitudinal direction A is directed, that is, in a direction of the object 72. That is, the transmission wave Tx is refracted by the dielectric lens 48 so as to travel along the measurement axis 40A. The transmission wave Tx travels as a plane wave corresponding to the effective diameter of the dielectric lens 48 and a diffracted wave around the plane wave. The transmission wave Tx forms a radio wave beam having high directivity. Therefore, since the region of the detection target surface (the region on which the transmission wave Tx strikes in the interface 74 of the object 72) is narrowed, unnecessary reflection due to surrounding obstacles or the like is reduced.

The transmission wave Tx guided to the object 72 is reflected at the interface 74 of the object 72 and becomes a reflected wave Rx. As illustrated in FIG. 5B, the reflected wave Rx traveling as a plane wave is received by the measurement window 40. The reflected wave Rx received by the measurement window 40 is first incident on the dielectric lens 48. The reflected wave Rx incident on the dielectric lens 48 is refracted between the ambient air and the dielectric lens 48 and between the dielectric lens 48 and the tapered wall 46, and travels in the tapered wall 46 as a spherical wave approaching the measurement axis 40A. As a result, the reflected wave Rx is guided to the reception unit 43R as a radio wave emitted from a dot-liked transmission source at the end portion on the surrounding wall 47 side via the waveguide 45.

The waveguide 45, the tapered wall 46, and the dielectric lens 48 arranged inside the sensor unit 16 guide the traveling direction of the radio wave to the direction of the measurement axis 40A by each directivity with respect to the radio wave, and thus they exhibit strong directivity with respect to the radio wave as a whole by combining them. Therefore, the sensor unit 16 can appropriately guide the transmission wave Tx and the reflected wave Rx even if the length direction dimension (length along the longitudinal direction A) is small. Therefore, the designer of the level meter 10 can reduce the dimension in the length direction of the sensor unit 16 by using the waveguide 45, the tapered wall 46, and the dielectric lens 48.

In addition, by appropriately guiding the transmission wave Tx and the reflected wave Rx, the transmission of the transmission wave Tx and the reception of the reflected wave Rx can be performed by the common measurement window 40 even though the position of the transmission unit 43T and the position of the reception unit 43R are different in the sensor IC 41. Therefore, the dimension of the sensor unit 16 becomes compact.

Furthermore, since the transmission wave Tx is greatly spread as a plane wave directed in the longitudinal direction A by the tapered wall 46 and then enters the dielectric lens

48, the transmission wave Tx converged by the dielectric lens 48 is guided to the object 72 with strong directivity even if the object 72 is far away. Therefore, the sensor unit 16 can measure the level of the object 72 at a long distance while being small in the length direction and compact.

Figure 6:
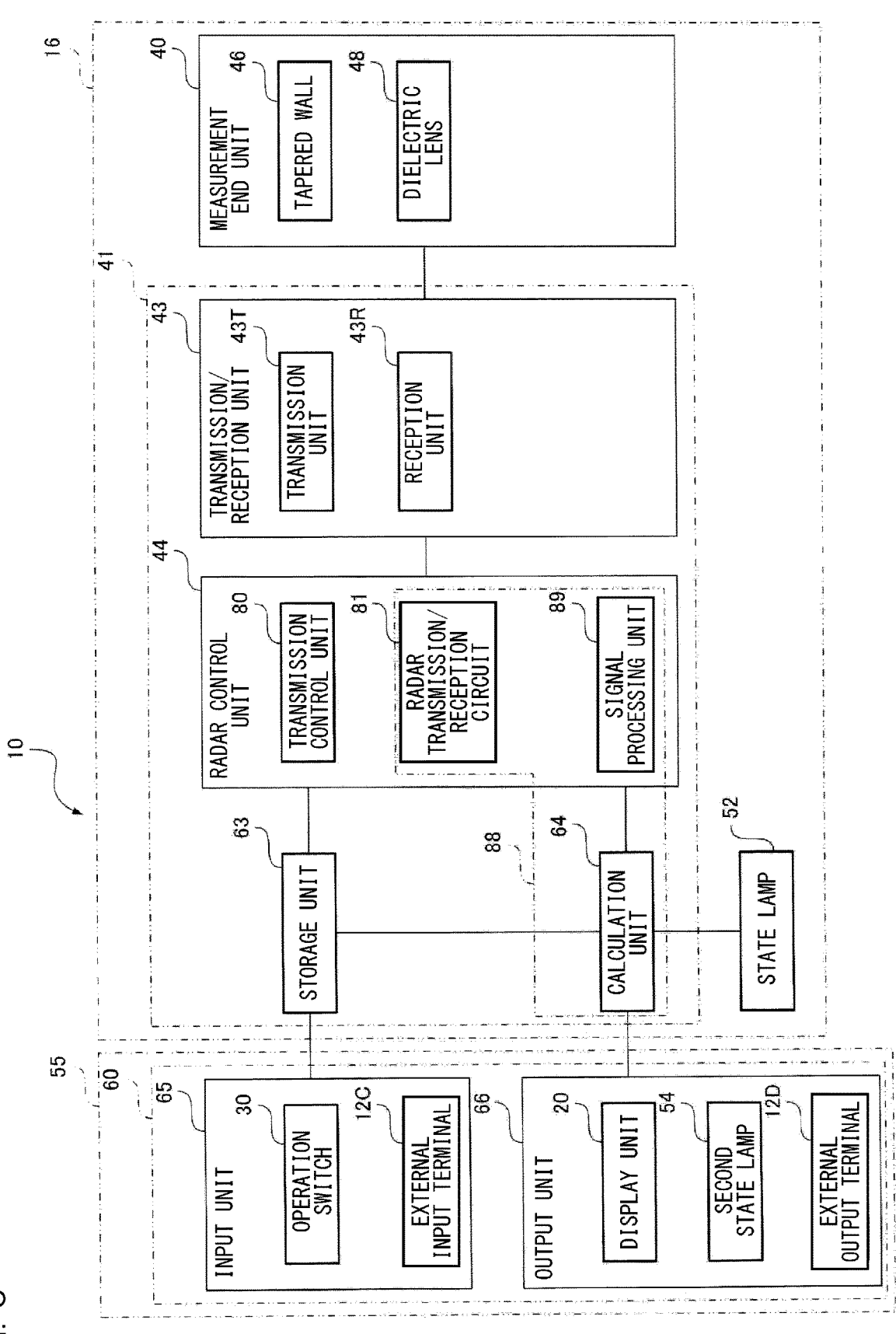
FIG. 6 is a block diagram schematically illustrating an example of a relationship between components of a level meter.

Next, an example of a relationship between the components of the level meter 10 will be described with reference to FIG. 6. FIG. 6 is a block diagram schematically illustrating a relationship between components of level meter 10. As illustrated in FIG. 6, the sensor IC 41 of the sensor unit 16 includes a transmission/reception unit 43, a radar control unit 44, a storage unit 63, and a calculation unit 64. The transmission/reception unit 43 includes a transmission unit 43T that transmits the transmission wave Tx and a reception unit 43R that receives the reflected wave Rx. The sensor IC 41 may include a plurality of ICs. For example, the sensor IC 41 may include an antenna-integrated MMIC and a microcomputer.

The radar control unit 44 includes a transmission control unit 80 that determines the waveform of the transmission wave Tx, a radar transmission/reception circuit 81 that performs mutual conversion between a digital signal and a radio wave, and a signal processing unit 89 that performs signal processing based on the transmission wave Tx and the reflected wave Rx. When the sensor IC 41 includes the antenna-integrated MMIC and the microcomputer, the antenna-integrated MMIC may include a portion (the transmission control unit 80 and the radar transmission/reception circuit 81) of the radar control unit 44 excluding the signal processing unit 89 and the transmission/reception unit 43, and the microcomputer may include the signal processing unit 89, the storage unit 63, and the calculation unit 64.

The storage unit 63 stores various setting values (data) related to the operation of the level meter 10. The calculation unit 64 performs various calculations relating to the operation of the level meter 10 based on the setting values stored in the storage unit 63, the signal processing result of the signal processing unit 89, and the like. The storage unit 63 includes a storage device such as a random access memory (RAM) and a read only memory (ROM). The calculation unit 64 includes a processor such as a central processing unit (CPU). Note that the storage unit 63 and the calculation unit 64 may be provided on the control board 60 of the controller 55. Alternatively, the storage units 63 and the calculation units 64 may be separately provided in the sensor unit 16 and the controller 55, respectively, and stored data and responsible arithmetic processing may be shared by the sensor unit 16 and the controller 55. As illustrated in FIG. 6, the calculation unit 64, the radar transmission/reception circuit 81 of the radar control unit 44, and the signal processing unit 89 together function as a sensor processing unit 88. The sensor processing unit 88 performs processing of measuring the level of the object based on at least the reception signal generated by the reception unit 43R.

On the other hand, the control board 60 of the controller 55 includes an input unit 65 and an output unit 66. The input unit 65 is an interface circuit that inputs an input provided from the outside of the level meter 10 to the level meter 10 as a signal. The input given from the outside of the level meter 10 is, for example, a user's operation on the operation unit 30, a control signal given from an external device such as an external control device via the external input terminal 12C, and the like. The input unit 65 causes the storage unit 63 to store, for example, flag information indicating that the operation unit 30 has been operated, and data such as a setting value provided via the external input terminal 12C.

The output unit 66 is an interface circuit that outputs a signal generated inside the level meter 10 to the outside. The output unit 66 changes, for example, the display content of the display unit 20, the lighting state of the second state lamp 54, and the like according to the calculation result (such as the value of the level Y) by the calculation unit 64. In addition, the output unit 66 transmits the calculation result by the calculation unit 64 to an external device via the external output terminal 12D. Note that the state lamp 52 of the sensor unit 16 is connected to the sensor IC 41, and changes the lighting state according to the calculation result by the calculation unit 64. The state lamp 52 and the second state lamp 54 are controlled to be in the same lighting state.

Figure 7:
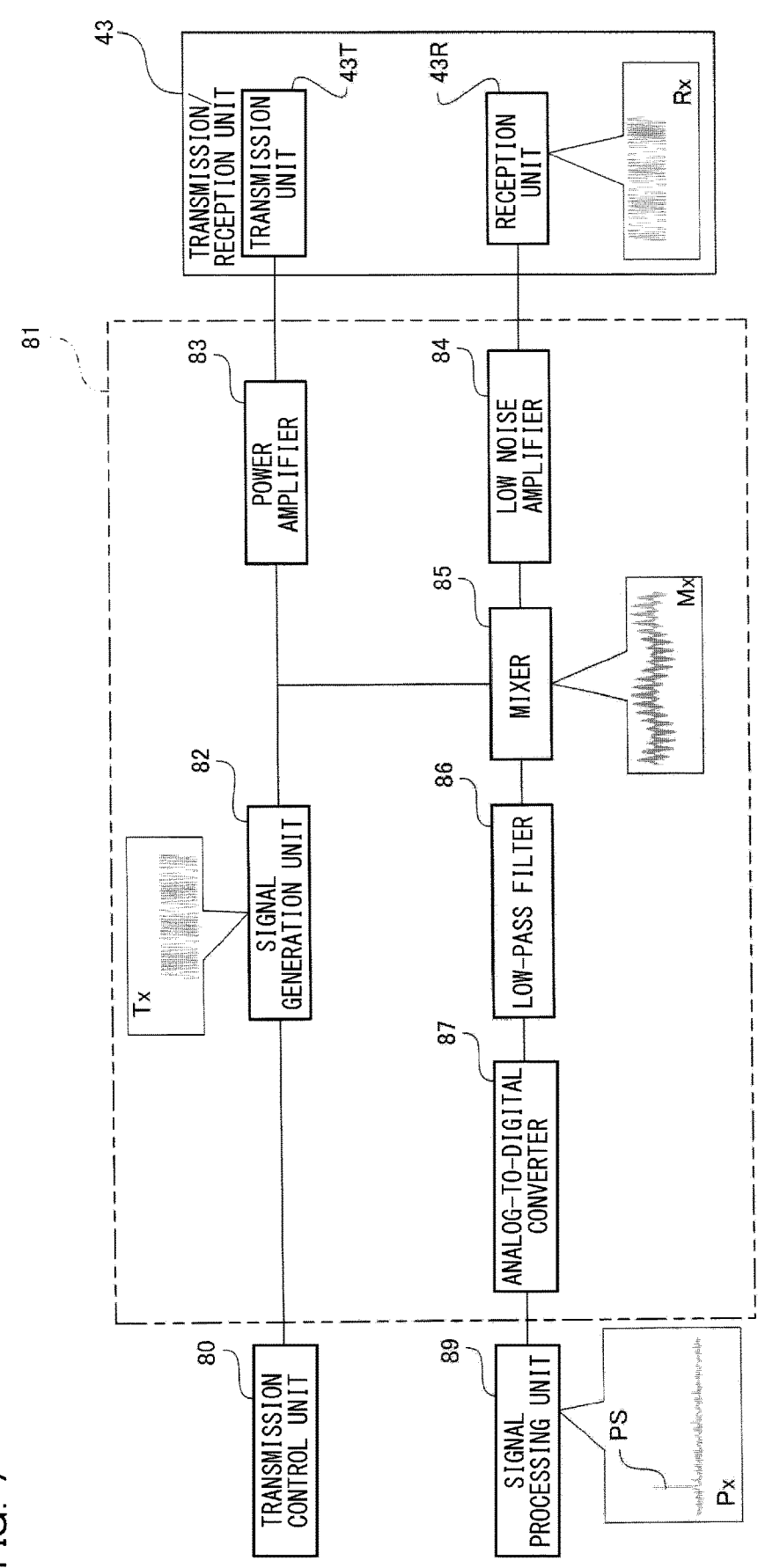
FIG. 7 is a view illustrating an example of a configuration of a radar control unit and a transmission/reception unit.
Figure 8:
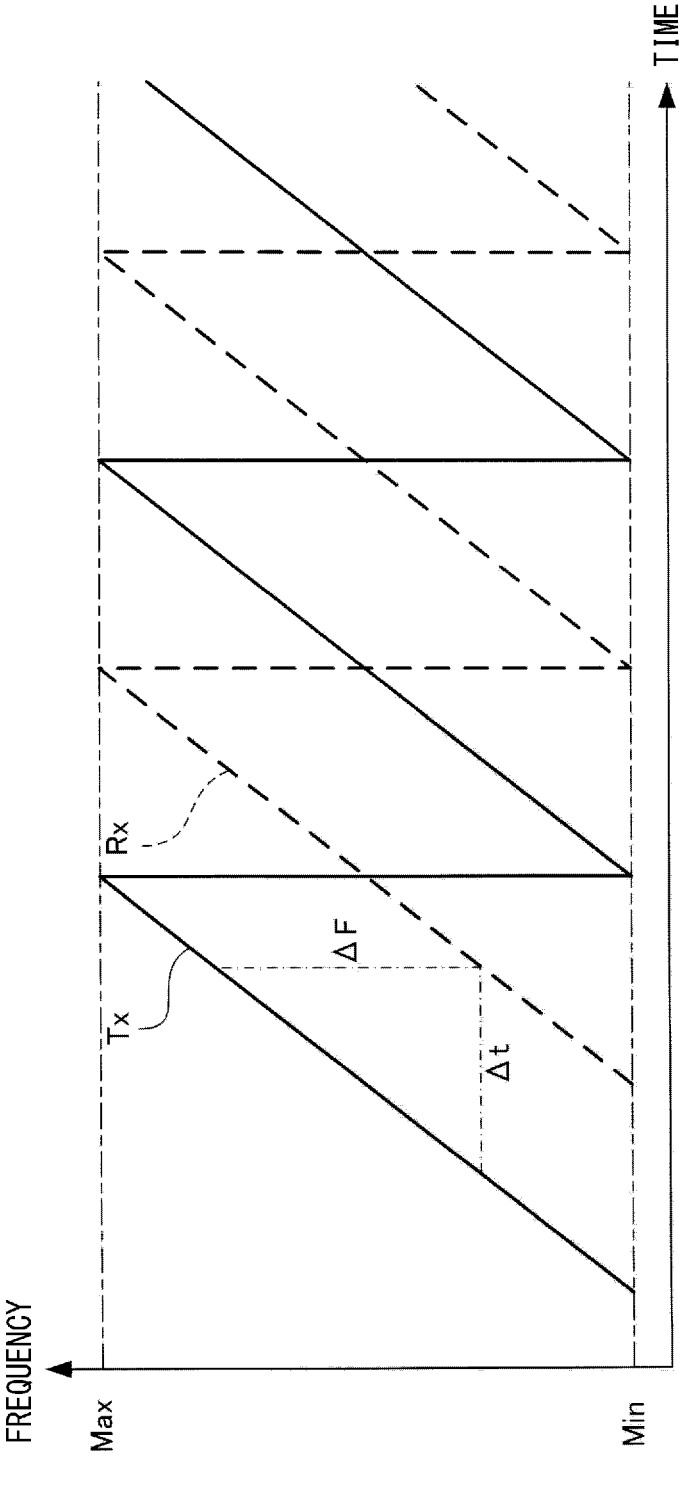
FIG. 8 is a view illustrating a relationship between a transmission wave and a reflected wave.

The measurement of the level Y by the level meter 10 will be described in more detail with reference to FIGS. 7 and 8. FIG. 7 is a view illustrating an example of configurations of the radar transmission/reception circuit 81 and the transmission/reception unit 43 included in the sensor IC 41. FIG. 8 is a view illustrating a relationship between a transmission wave Tx and a reflected wave Rx.

As illustrated in FIG. 7, the radar transmission/reception circuit 81 includes a signal generation unit 82, a power amplifier 83, a low noise amplifier 84, a mixer 85, a low-pass filter 86, and an analog-to-digital converter 87.

The level meter 10 of the present embodiment measures the level Y by a radar method using FMCW. The signal generation unit 82 is connected to the transmission control unit 80. When receiving data indicating the waveform of the transmission wave Tx determined by the transmission control unit 80, the signal generation unit 82 generates a transmission signal having the waveform of the transmission wave Tx according to the data. Here, as the waveform of the transmission wave Tx, a waveform that repeats increase and decrease in frequency is used.

FIG. 8 is a graph illustrating a change in frequency of the transmission wave Tx (and the reflected wave Rx) with respect to time. In FIG. 8, the frequency of the transmission wave Tx increases linearly with time from a minimum value (Min), and returns to the minimum value again when reaching a maximum value (Max). In this manner, the frequency of the transmission wave Tx repeatedly increases and decreases. The increasing/decreasing pattern of the frequency is not limited to this, and for example, a pattern may be used in which the frequency decreases linearly with time from the maximum value and returns to the maximum value again when reaching the minimum value. In addition, a pattern of repeating linear increase/decrease and decrease between the maximum value and the minimum value may be used. The transmission wave Tx used in the present embodiment is a radio wave in the 60 GHz band, and the minimum value of the frequency is, for example, 58 GHz and the maximum value is, for example, 69 GHZ. The frequency band to be used is not limited thereto, and for example, a frequency of 77 GHz to 81 GHz may be used.

The transmission signal generated by the signal generation unit 82 in FIG. 7 is amplified by the power amplifier 83 and sent to the transmission unit 43T. The transmission unit 43T generates a radio wave having a waveform corresponding to the transmission signal and transmits the radio wave as a transmission wave Tx to the object 72. The radio wave (transmission wave Tx) transmitted by the transmission unit 43T is transmitted through the measurement window 40, travels toward the object 72, and is reflected by the interface 74 of the object 72 to become a reflected wave Rx. Here, the reflected wave Rx is a wave out of phase with respect to the transmission wave Tx. The reflected wave Rx is received by the reception unit 43R through the measurement window 40.

The reception unit 43R generates a reception signal corresponding to the received radio wave (reflected wave Rx).

As indicated by a broken line in FIG. 8, the reflected wave Rx is a wave shifted from the transmission wave Tx by a time difference Δt. The time difference Δt is a value corresponding to the distance YA (FIG. 4) from the measurement window 40 to the interface 74 of the object 72. Since the reflected wave Rx reciprocates between the measurement window 40 and the object 72, there is a relationship of Δt=2×YA/c where c is the speed of light.

Then, a frequency difference ΔF corresponding to the magnitude of the time difference Δt is generated between the transmission wave Tx and the reflected wave Rx. There is a certain relationship between the frequency difference ΔF and the time difference Δt depending on the waveform of the transmission wave Tx. The waveform of the transmission wave Tx is a waveform whose frequency linearly changes with the lapse of time. That is, there is a certain relationship between the frequency difference ΔF and the time difference Δt according to the frequency change per unit time in the waveform of the transmission wave Tx. For example, the frequency of the transmission wave Tx increases linearly from the minimum value (Min) as time elapses, and reaches the maximum value (Max). In this case, the relationship between the frequency difference ΔF and the time difference Δt is uniquely determined by the difference between the maximum value and the minimum value of the frequency of the transmission wave Tx, which is the bandwidth of frequency modulation, and the relationship of the frequency change with time. Therefore, the level meter 10 can calculate, for example, the time difference Δt based on the frequency difference ΔF that is a difference between the transmission wave Tx and the reflected wave Rx. Then, the level meter 10 can calculate the distance YA (Δt×c/2) from the time difference Δt. Further, the level meter 10 can calculate the value of the level Y based on the distance YA. Specifically, the difference between the depth of the tank 70 (the distance from the bottom of the tank 70 to the measurement window 40) and the distance YA is the value of the level Y. Therefore, the sensor processing unit 88 of the level meter 10 can measure, for example, the level Y of the object 72 corresponding to the difference between the timing at which the radio wave (transmission wave Tx) is transmitted from the transmission unit 43T and the timing at which the radio wave (reflected wave Rx) is received by the reception unit 43R. That is, the sensor processing unit 88 can measure the level of the object 72 based on at least the reception signal generated by the reception unit 43R. Since there is a certain relationship between the frequency difference ΔF and the time difference Δt depending on the waveform of the transmission wave Tx, the correspondence relationship between the frequency difference ΔF and the distance YA can be obtained in advance. The correspondence relationship between the frequency difference ΔF and the distance YA may be stored in advance in the storage unit 63.

On the other hand, in FIG. 7, the reception signal corresponding to the reflected wave Rx received by the reception unit 43R is input to the mixer 85 via the low noise amplifier 84. A transmission signal corresponding to the waveform of the transmission wave Tx output from the signal generation unit 82 is also input to the mixer 85, and the mixer 85 generates a signal corresponding to a mixed wave Mx obtained by mixing the waveforms of the transmission wave Tx and the reflected wave Rx. Specifically, the mixer 85 included in the radar transmission/reception circuit 81 functioning as a part of the sensor processing unit 88 mixes the transmission signal and the reception signal to generate an IF signal (IF: intermediate frequency) corresponding to the mixed wave Mx.

The IF signal (intermediate frequency signal) corresponding to the mixed wave Mx has a waveform including a high frequency component derived from the frequency of the 60 GHZ band of the transmission wave Tx and the reflected wave Rx and a low frequency component corresponding to the frequency difference ΔF between the transmission wave Tx and the reflected wave Rx. The IF signal (intermediate frequency signal) corresponding to the mixed wave Mx is input to the low-pass filter 86, and a waveform having a low frequency according to the frequency difference ΔF is extracted. The extracted low-frequency waveform is input to the analog-to-digital converter 87. The analog-to-digital converter 87 converts a low-frequency waveform into a digital value and outputs the digital value to the signal processing unit 89.

The signal processing unit 89 that functions as a part of the sensor processing unit 88 converts the low-frequency waveform output from the analog-to-digital converter 87 into a frequency signal Px by fast Fourier transform processing or the like. The frequency signal Px is a signal indicating wave intensity for each frequency, and a frequency corresponding to the maximum peak PS of the frequency signal Px is a frequency difference ΔF between the transmission wave Tx and the reflected wave Rx. The signal processing unit 89 transmits the frequency signal Px to the calculation unit 64 in FIG. 6.

The calculation unit 64 functioning as a part of the sensor processing unit 88 calculates the values of the distance YA and the level Y based on the frequency signal Px. In calculating the values of the distance YA and the level Y, the calculation unit 64 refers to the setting values stored in the storage unit 63. For example, the storage unit 63 stores a correspondence relationship between the frequency difference ΔF and the distance YA, a value (depth of the tank 70) for calculating the level Y from the distance YA, and the like.

Depending on the measurement environment, a peak other than the maximum peak PS may appear in the frequency signal Px due to an element other than the interface 74 of the object 72 (for example, a device such as a stirrer provided in the tank 70). Even if there are a plurality of peaks in the frequency signal Px, the calculation unit 64 can specify only the maximum peak PS derived from the object 72 by appropriately performing calculation. For example, the data of the frequency signal Px obtained in advance in a state where there is no object 72 (state where the tank 70 is empty) may be stored in the storage unit 63. The calculation unit 64 can specify the maximum peak PS derived from the object 72 by examining a difference between the frequency signal Px obtained in a state where the object 72 does not exist and the frequency signal Px obtained in a state where the object 72 exists.

After calculating the frequency difference ΔF corresponding to the maximum peak PS of the frequency signal Px, the calculation unit 64 calculates the values of the distance YA and the level Y based on the frequency difference ΔF and the setting value stored in the storage unit 63. In this manner, the calculation unit 64 functioning as a part of the sensor processing unit 88 measures the level Y of the object 72 based on the intermediate frequency signal. The calculation unit 64 transmits the calculated value of the level Y to the output unit 66 and the state lamp 52. The output unit 66 changes the display content of the display unit 20 and the lighting state of the second state lamp 54 according to the value of the level Y. The state lamp 52 changes the lighting state according to the value of the level Y similarly to the second state lamp 54. As a result, the lighting states of the state lamp 52 of the sensor unit 16 and the second state lamp 54 of the controller 55 change according to the comparison result between the level Y measured by the sensor processing unit 88 and the threshold set by the operation unit 30. In addition, the value of the level Y is sent to an external control device that performs control related to the level Y through the external output terminal 12D. The output unit 66 may output a binary or multi-valued control signal based on the comparison result between the calculated value of the level Y and the threshold to the external control device through the external output terminal 12D. In addition, instead of the value of the level Y itself, a signal indicating that specific control according to the state of the level Y is to be executed may be sent to the external control device. For example, when the level Y is above a certain threshold or below a certain threshold, a signal indicating that the operation of the pump, valve or the like should be changed may be sent to the external control device.

Figure 9:
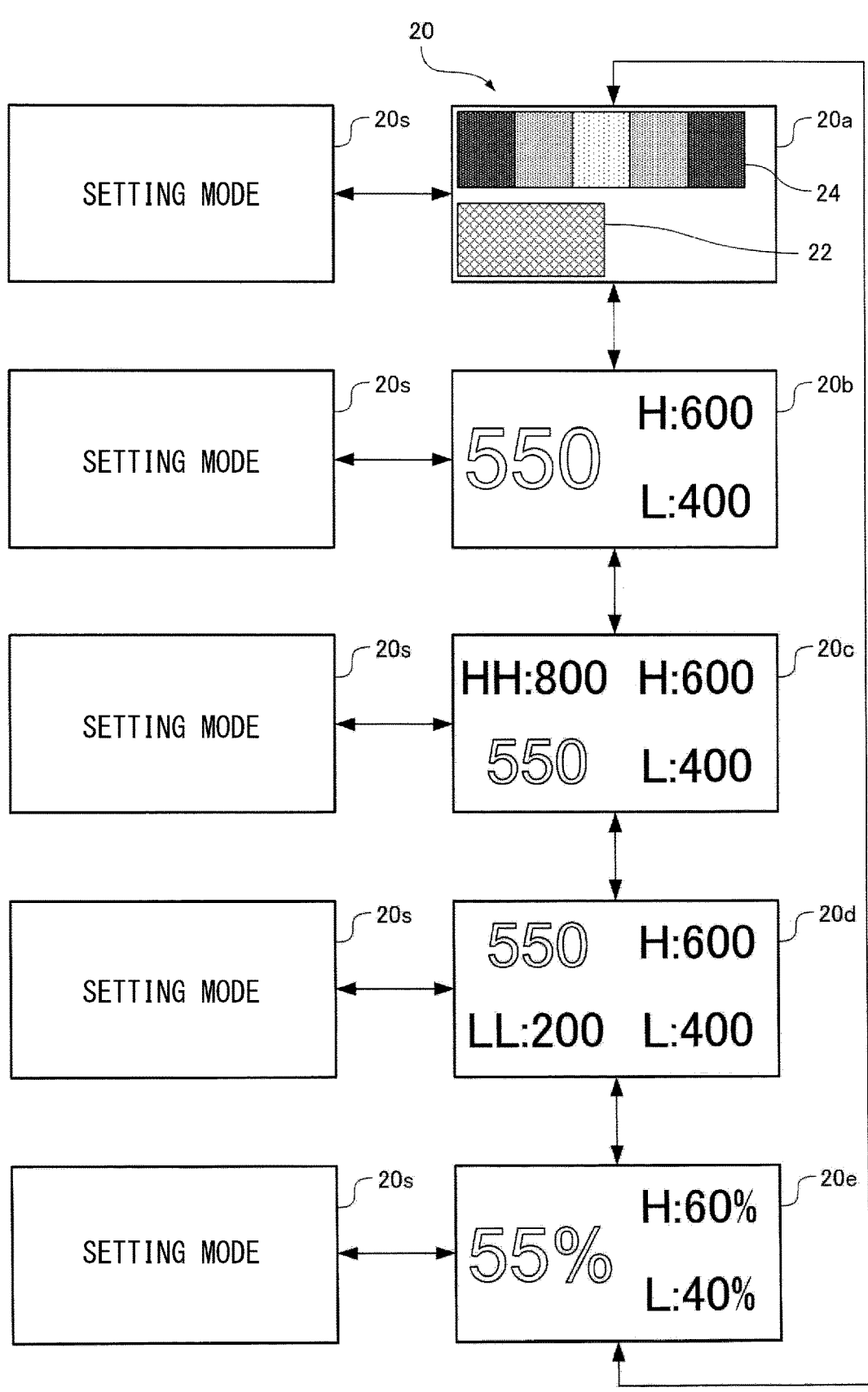
FIG. 9 is a view for explaining mode transition of a display unit.

Next, switching of the display mode of the display unit 20 will be described with reference to FIG. 9. FIG. 9 is a view for explaining mode transition of the display unit 20.

The display unit 20 includes a plurality of display modes, and the display unit 20 can display the level Y and the level range to which the level Y belongs in a different format depending on the display mode. For example, when the user operates the direction key 33 (FIG. 1) of the operation unit 30, the display mode of the display unit 20 is switched.

As illustrated in FIG. 9, the display mode in which the bar graph 22 and the gauge 24 are displayed on the display unit 20 is a first display mode 20a. When the up key 34 of the direction key 33 is operated in a state where the first display mode 20a is displayed on the display unit 20, the display of the display unit 20 is switched to a second display mode 20b. Further, every time the up key 34 is operated, the display on the display unit 20 is switched to a third display mode 20c, a fourth display mode 20d, and a fifth display mode 20e in FIG. 10. When the up key 34 is further operated from the state in which the fifth display mode 20e is displayed, the display on the display unit 20 returns to the first display mode 20a.

On the other hand, each time the down key 35 is operated, the display mode is switched in the reverse order of the up key 34. That is, every time the down key 35 is operated from the state in which the first display mode 20a is displayed, the display on the display unit 20 is sequentially switched to the fifth display mode 20e, the fourth display mode 20d, the third display mode 20c, the second display mode 20b, and the first display mode 20a.

In addition, in each display mode, when the setting key 32 is operated, the display of the display unit 20 is switched to a setting mode 20s. In the setting mode 20s, the user can change the setting value related to the operation of the level meter 10 by operating the direction key 33 (up key 34, down key 35). In particular, the user can change the setting of the threshold of level Y in the setting mode 20s. In other words, the operation unit 30 receives a setting operation of (one or more) thresholds for dividing the level range for the level Y as parameters related to the measurement of the level Y. By changing the setting of the threshold of the level Y, the setting of the level range is also changed. That is, the user can change the setting of the level range by operating the operation unit 30 including the setting key 32 and the direction key 33.

Then, when the setting key 32 is operated again in the setting mode 20s, the display of the display unit 20 returns to the original display mode. Accordingly, as illustrated in FIG. 9, the display of the display unit 20 is cyclically switched between a plurality of display modes (the first display mode 20a, the second display mode 20b, the third display mode 20c, the fourth display mode 20d, and the fifth display mode 20e) by operating the direction keys 33. In addition, the display of the display unit 20 is switched between each display mode and the setting mode 20s by operating the setting key 32.

Figure 10:
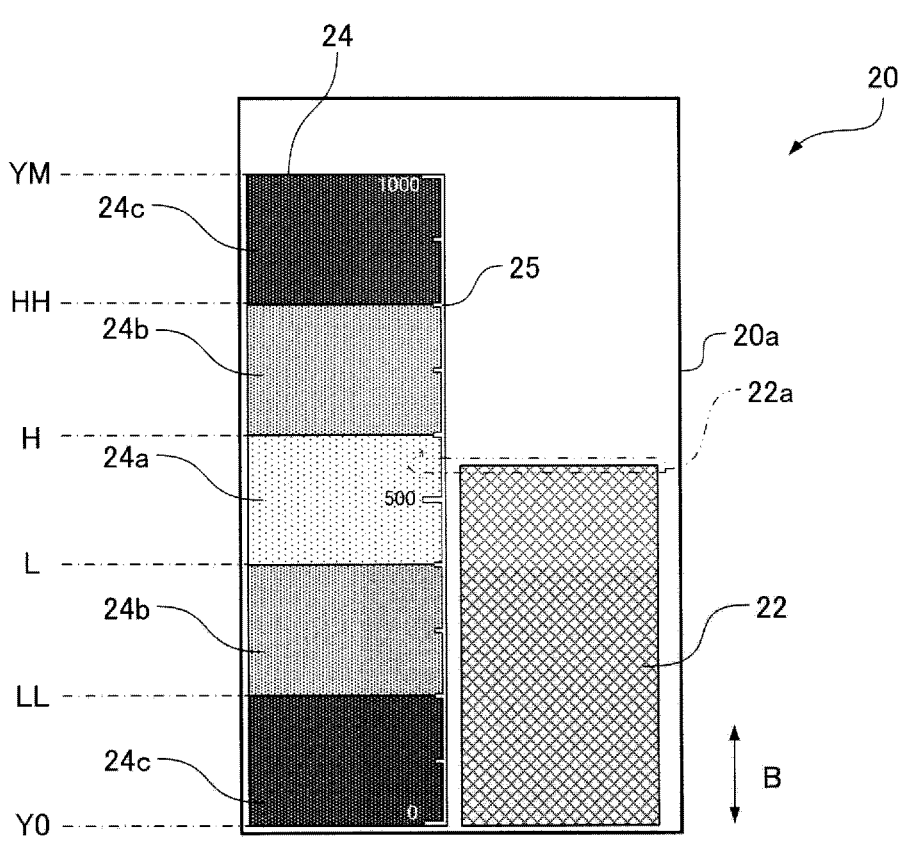
FIG. 10 is a view illustrating a bar graph and a gauge displayed on a display unit.

Next, display contents of the display unit 20 in the first display mode 20a will be described with reference to FIG. 10. FIG. 10 is a view illustrating the bar graph 22 and the gauge 24 displayed on the display unit 20 in the first display mode 20a. The display unit 20 performs display according to the measured level Y. As illustrated in FIG. 10, display including the bar graph 22 whose length expands and contracts according to the value of the level Y is performed on the display unit 20 of the first display mode 20a. In addition to the bar graph 22, the gauge 24 is displayed on the display unit 20. The bar graph 22 and the gauge 24 are displayed as elongated bars along the front-rear direction B of the controller 55.

The gauge 24 is displayed with a predetermined length (length specified by the setting value) according to the setting value stored in the storage unit 63 (FIG. 6). The gauge 24 is divided into a plurality of sections along its length direction (front-rear direction B). In FIG. 10, the gauge 24 is divided into five sections. These sections are divided based on one or more predetermined (set) thresholds. The threshold is a part of the setting value stored in the storage unit 63. The threshold is a value determined with respect to the level Y of the object 72, and a numerical range between the thresholds is a plurality of predetermined level ranges. In other words, the one or more thresholds divide a plurality of level ranges for a level. In FIG. 10, four thresholds (HH, H, L, LL) and an upper limit (YM) and a lower limit (Y0) of the measurement range are set, and a numerical range between these values is set as five level ranges for level Y. Each section of the gauge 24 corresponds to each level range. The number of sections of the gauge 24 is not limited to 5. For example, in a case where only either the upper limit or the lower limit of level Y is displayed, the number of sections is two. In addition, in a case where the upper limit and the lower limit of the level Y are displayed, the number of sections is three. As such, the separators of the gauge 24 may have various patterns depending on the elements to be displayed.

Hereinafter, the central section among the five sections illustrated in FIG. 10 is referred to as a standard section 24a. Two sections vertically adjacent to the standard section 24a are referred to as a warning section 24b, and sections vertically separated from the standard section 24a with the warning section 24b interposed therebetween (sections located at upper and lower ends of the gauge 24) are referred to as dangerous sections 24c. When the five sections are distinguished from each other, the upper dangerous section 24c, the upper warning section 24b, the standard section 24a, the lower warning section 24b, and the lower dangerous section 24c are referred to in order from the top of the gauge 24. The five level ranges corresponding to these five sections are referred to as an upper dangerous range, an upper warning range, a standard range, a lower warning range, and a lower danger range, respectively.

In FIG. 10, the sections of the gauge 24 are color-coded with colors corresponding to the respective level ranges. For example, the standard section 24a may be displayed in green corresponding to the standard range, the warning section 24b may be displayed in yellow corresponding to the warning range, and the dangerous section 24c may be displayed in red corresponding to the dangerous range. Note that the upper warning section 24b and the lower warning section 24b may have different colors. Similarly, the upper dangerous section 24c and the lower dangerous section 24c may have different colors. The color of the section of the gauge 24 may be represented by monochrome shading or color. That is, if the gauge 24 is displayed in a single color (monochrome), each section may be divided by a difference in shading, a difference in pattern, and the like. When the gauge 24 is displayed in color, each section may be divided according to a difference in color. In addition, even when the gauge 24 is displayed in color, shading, a pattern, and the like may be different in each section. Furthermore, the color of each section may be changed by the operation of the operation unit 30 by the user. In this case, the setting of the color assigned to each section may be selected from a plurality of assignment patterns (combinations) prepared in advance by the operation of the operation unit 30 by the user, or the color assigned to each section may be individually selected. In addition, the lighting state of each section may be selected by the operation of the operation unit 30 by the user. In this case, the lighting state may be selected from among turn-on, turn-off, and blinking.

The bar graph 22 is displayed next to the gauge 24, and its length expands and contracts along the front-rear direction B according to the measured value of the level Y. When the gauge 24 is color-coded, the bar graph 22 is preferably displayed in a color (for example, blue) different from each section of the gauge 24 so that the user can easily distinguish the bar graph 22 and the gauge 24 even from a long distance. In FIG. 10, the bar graph 22 extends from the lower side to the upper side as the value of the level Y is larger. That is, as the bar graph 22 extends, the tip of the length of the bar graph 22 in the front-rear direction B (the upper end in FIG. 10) is further away from the base portion in the front-rear direction B (the lower end in FIG. 10). Therefore, the bar graph 22 shows a larger value of the level Y as the tip in the front-rear direction B is farther from the base portion in the front-rear direction B. Similarly, the gauge 24 also corresponds to a larger value with increasing distance from the base portion in the front-rear direction B. Since the value of the level Y increases as the interface 74 of the object 72 moves away from the bottom surface of the tank 70, the movement of the tip of the bar graph 22 reflects the movement of the interface 74. Therefore, according to the bar graph 22 and the gauge 24 in FIG. 10, it is easy for the user to visually grasp the state of the level Y, that is, which level range the level Y belongs to, and how the level Y fluctuates (increases or decreases).

It is preferable that the display states of the state lamp 52 and the second state lamp 54 change depending on which level range the level Y belongs to. Specifically, the display state is preferably changed by switching the light emission state, the light-off state, the blinking state, the emission color, and the like of the state LED 50. When the display states of the state lamp 52 and the second state lamp 54 change according to which level range the level Y belongs to, the user can know the state such as normal, caution, warning, or abnormality of the level Y of the object 72 even at a position away from the sensor unit 16 and the second state lamp 54. Alternatively, the user can roughly know the state of the level Y.

An example of setting the upper limit and the lower limit of the measurement range will be described. The measurement range indicates the range of the level Y measured by the level meter 10, and for example, the lower limit of the measurement range is a value (zero point Y0, e.g. 0 mm) indicating that the object 72 does not exist in the tank 70 (the tank 70 is empty). The upper limit of the measurement range is a value (full-volume value YM, e.g. 1000 mm) indicating that the tank 70 cannot accommodate the object 72 any more (the tank 70 is full). The upper limit and the lower limit of the measurement range may be set by the user operating the operation unit 30.

An example of setting the threshold will be described. For example, the threshold is set as a value indicating that "If the level Y exceeds or falls below this value, the amount of the object 72 needs to be adjusted" with respect to the object 72 in the tank 70. The threshold may be set by the user operating the operation unit 30. Four thresholds, that is, a high upper-limit value HH (first threshold), an upper limit value H (second threshold), a lower limit value L (third threshold), and a low lower-limit value LL (fourth threshold) are set in order from the full-volume value YM that is the upper limit of the measurement range. The supply of the object 72 in the tank 70 to, for example, a water treatment process lowers the level Y of the object 72 in the tank 70. On the other hand, as the tank 70 is replenished with the object 72, the level Y of the object 72 in the tank 70 rises. In this case, the water injection device 78 controls the replenishment of the object 72 to the tank 70 according to the level Y of the object 72 in the tank 70 such that the level Y of the object 72 in the tank 70 that decreases according to the water treatment process falls within a predetermined range. Specifically, the water injection device 78 controls the replenishment of the object 72 to the tank 70 such that the level Y of the object 72 in the tank 70 is between the upper limit value H (second threshold) and the lower limit value L (third threshold). When the water injection device 78 normally operates, the level Y of the object 72 in the tank 70 falls within the range of the upper limit value H (second threshold) and the lower limit value L (third threshold). However, when the level Y of the object 72 deviates from the predetermined range by a certain amount or more although the water injection device 78 controls the level Y of the object 72 in the tank 70, it is determined that an abnormality has occurred, and the entire operation of facilities (for example, water treatment facilities) including the water injection device 78, the water treatment process device, and the like is stopped. The high upper-limit value HH is a value (for example, 800 mm) at which the entire water treatment facility should be stopped immediately when the level Y exceeds this value. The upper limit value H is a value (for example, 600 mm) at which the water injection into the tank 70 should be stopped when the level Y exceeds this value. The lower limit value L is a value (for example, 400 mm) at which the water injection into the tank 70 should be started when the level Y falls below this value. The low lower-limit value LL is a value (for example, 200 mm) at which the entire water treatment facility should be stopped immediately when the level Y falls below this value.

The upper dangerous section 24c corresponds to a level range (upper dangerous range) between the full-volume value YM, which is the upper limit of the measurement range, and the high upper-limit value HH. The upper warning section 24b corresponds to a level range (upper warning range) between the high upper-limit value HH and the upper limit value H. The standard section 24a corresponds to a level range (standard range) between the upper limit value H and the lower limit value L. The lower warning section 24b corresponds to a level range (lower warning range) between the lower limit value L and the low lower-limit value LL.

The lower dangerous section 24c corresponds to a level range (lower danger range) between the low lower-limit value LL and the zero point Y0 which is the lower limit of the measurement range. A range of each section of the gauge 24 is defined by each corresponding threshold. The display range of each section may have a length corresponding to a threshold defining each section. In this case, when the threshold is changed by the operation of the operation unit 30 by the user, the display range of each section is changed to a length corresponding to the section defined by the changed threshold.

In FIG. 10, the level range to which the level Y belongs is illustrated depending on which position of the section of the gauge 24 the length of the bar graph 22 has reached. More specifically, the length of the bar graph 22 displayed next to the gauge 24 expands and contracts according to the value of the level Y, so that the distal end portion moves along the front-rear direction B. Then, the level range to which the level Y belongs is indicated depending on which section of the gauge 24 the distal end portion of the bar graph 22 is located next to. Note that an arrow shape 22a (an arrow indicated by a two-dot chain line in FIG. 10) extending toward the gauge 24 may be displayed at the distal end portion of the bar graph 22 so that it is easy to visually understand which section of the gauge 24 the tip of the bar graph 22 corresponds to. Further, a scale 25 indicating the value of the level Y may be displayed to be superimposed on the gauge 24. It is preferable that the setting as to whether to display the arrow shape 22a and the scale 25 can be changed by the user operating the operation unit 30.

Here, the level range to which the level Y belongs is specifically information indicating between which two thresholds the measured value of the level Y is. In FIG. 10, which level range the level Y belongs to is displayed depending on which section of the gauge 24 the distal end portion of the bar graph 22 is located next to.

For example, in FIG. 10, the distal end portion of the bar graph 22 is located next to the standard section 24a. In this case, the level Y belongs to a level range (standard range) between the upper limit value H and the lower limit value L. Therefore, the user of the level meter 10 can easily visually grasp that the level Y of the object 72 is in a state between the upper limit value H and the lower limit value L by visually observing the bar graph 22 and the gauge 24 of the display unit 20. As described above, according to the level meter 10 of the present embodiment, the user can visually grasp the state of the level Y of the object 72 to be measured using the controller 55 even at a position away from the sensor unit 16 attached to the tank 70. Furthermore, the state (status) of the object 72 based on the level Y is preferably also indicated by the lighting states of the state lamp 52 and the second state lamp 54. For example, when the level Y belongs to a level range (standard range) corresponding to the standard section 24a, the state lamp 52 and the second state lamp 54 may be turned on in green. Further, when the level Y belongs to the level range (warning range) corresponding to the warning section 24b, the state lamp 52 and the second state lamp 54 may be turned on in yellow. Further, when the level Y belongs to the level range (danger range) corresponding to the dangerous section 24c, the state lamp 52 and the second state lamp 54 may be turned on in red. As described above, when the lighting states of the state lamp 52 and the second state lamp 54 change depending on the level range to which the level Y belongs, the user can more easily and visually grasp the state of the level Y of the object 72. The color of each section of the gauge 24 may be changed by the user operating the operation unit 30. The lighting state of the state lamp 52 may also be changed according to the display state of each section of the gauge 24. For example, it is assumed that there are five sections of the gauge 24, and red lighting, yellow lighting, green lighting, yellow lighting, and red lighting are allocated to each section in order from the top. Then, it is assumed that a change is made such that red lighting, yellow blinking, green lighting, turning-off, and red blinking are assigned to each section in order from the top by the user's operation. In this case, if the distal end portion of the bar graph 22 is located next to the second section from the top of the gauge 24, the state lamp 52 lights up in yellow before the assignment is changed, and blinks in yellow after the assignment is changed. In this case, the lighting color of the state lamp 52 and the second state lamp 54 may also be changed according to the color of each section of the gauge 24. For example, it is assumed that there are four sections of the gauge 24, and red, yellow, green, and yellow are assigned to each section in order from the top. Then, it is assumed that a change is made by the user's operation so that yellow, green, yellow, and red are assigned to each section in order from the top. In this case, if the distal end portion of the bar graph 22 is located next to the uppermost section of the gauge 24, the state lamp 52 and the second state lamp 54 are lit in red before the assignment is changed, and is lit in yellow after the assignment is changed. Note that the color of each section of the gauge 24 and the color of the state lamp 52 corresponding to each section may not necessarily match. For example, when the distal end portion of the bar graph 22 corresponds to a section displayed in yellow, the state lamp 52 may blink in red.

In the display modes other than the first display mode 20a, the value of the level Y may be displayed in a ratio to the full-volume value YM that is a numerical value or the upper limit of the measurement range. For example, as illustrated in FIG. 9, in the second display mode 20b, the numerical value (550 mm, unit not shown here) of the current level Y is displayed to be large, and the numerical values of the upper limit value H (600 mm) and the lower limit value L (400 mm) are displayed to be smaller than the numerical value of the level Y. The upper limit value H, which should be a numerical value larger than the level Y, and the lower limit value L, which should be a numerical value smaller than the level Y, are displayed on the upper side and the lower side, respectively, with respect to the direction of the numerical value displayed on the display unit 20. As described above, depending on the display mode, the display unit 20 can display the measured level Y and the threshold of the level range as numerical values.

In the third display mode 20c of FIG. 9, in addition to the numerical values of the upper limit value H and the lower limit value L, a numerical value of the high upper-limit value HH (800 mm) is also displayed. In the third display mode 20c, the numerical values of the level Y are displayed in the same magnitude as the numerical values of the high upper-limit value HH, the upper limit value H, and the lower limit value L. However, the numerical value of the level Y is preferably highlighted so as to be distinguishable from other numerical values. In FIG. 9, the numerical value of the level Y is displayed as an outline number. The high upper-limit value HH and the upper limit value H are displayed upward, and the numerical value of the level Y and the lower limit value L are displayed downward with respect to the direction of the number displayed on the display unit 20.

In the fourth display mode 20d of FIG. 9, in addition to the numerical values of the upper limit value H and the lower limit value L, the numerical values of the low lower-limit value LL (200 mm) are also displayed. In the fourth display mode 20*d*, the numerical value of the level Y is displayed in the same magnitude as the numerical values of the upper limit value H, the lower limit value L, and the low lower-limit value LL. The numerical value of the level Y and the upper limit value H are displayed upward, and the lower limit value L and the low lower-limit value LL are displayed downward with respect to the direction of the number displayed on the display unit 20. As illustrated in the third display mode 20*c* and the fourth display mode 20*d*, the display unit 20 can display numerical values of various set thresholds by switching the display mode.

In the fifth display mode 20*e* of FIG. 9, "55%" is largely displayed as the ratio of the value (550 mm) of the level Y to the full-volume value YM (1000 mm). As the ratio of the upper limit value H (600 mm) and the lower limit value L (400 mm) to the full-volume value YM (1000 mm), "60%" and "40%" are displayed to be smaller than the level Y. In this manner, depending on the display mode, the display unit 20 can display the measured level Y and the threshold of the level range in a ratio to the full-volume value YM (allowable upper limit value).

As described above, by providing a plurality of display modes, the display unit 20 can display a fine numerical value or a ratio of the level Y to the full-volume value YM in another display mode while performing display that is visually easy for the user in the first display mode 20*a*, for example.

Figure 11:
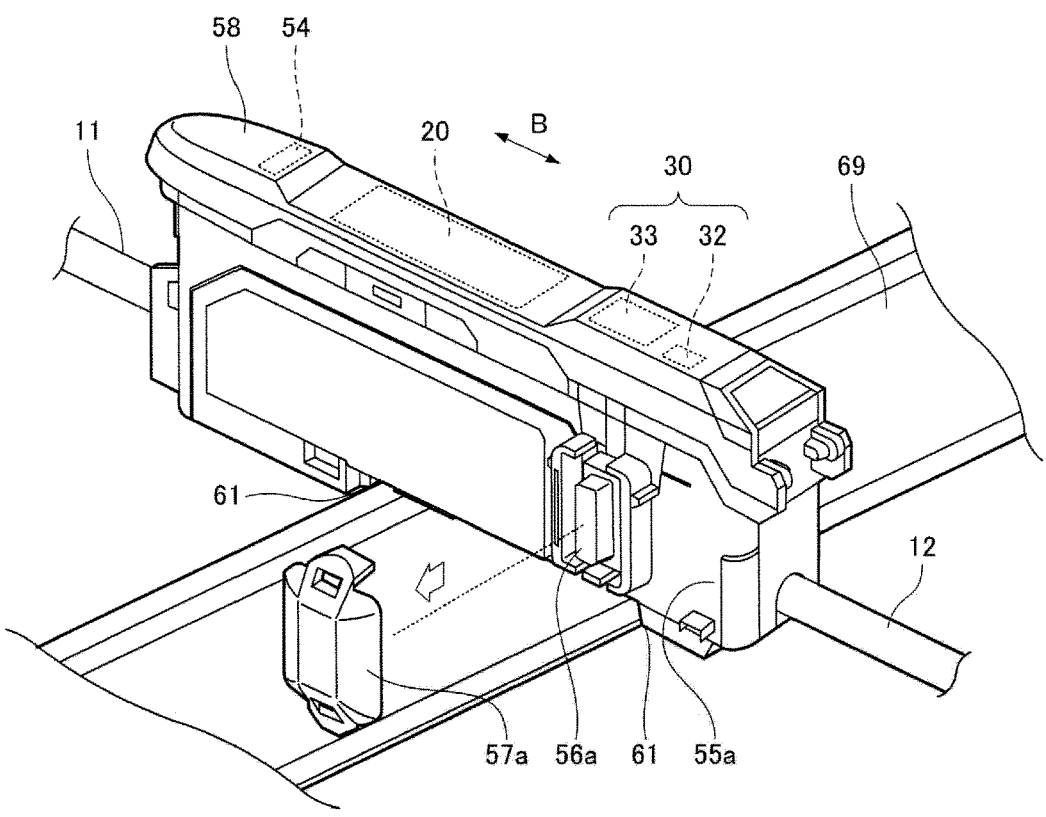
FIG. 11 is a view illustrating a state in which a power transmission terminal of a first controller is exposed.
Figure 12:
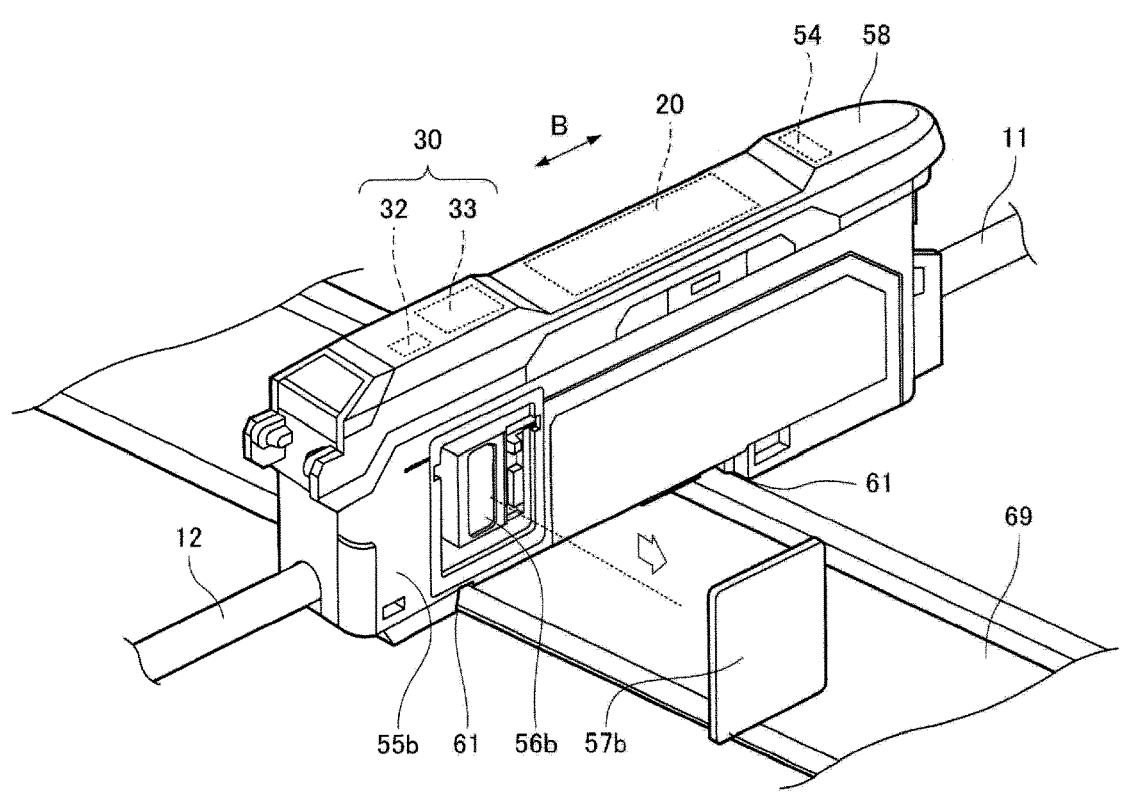
FIG. 12 is a view illustrating a state in which a power reception terminal of a second controller is exposed.
Figure 13:
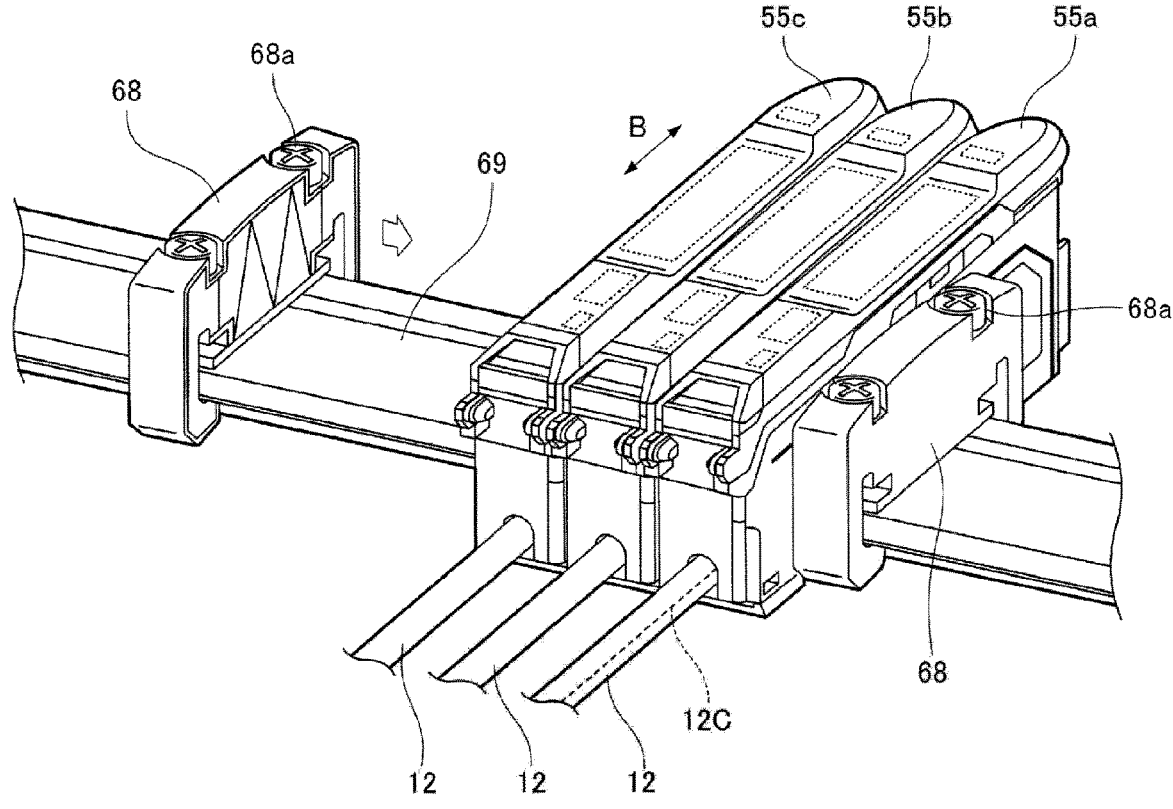
FIG. 13 is a view illustrating a state in which a plurality of controllers are attached side by side to a rail.

Next, a case where a plurality of controllers 55 are used will be described with reference to FIGS. 11, 12, and 13. FIG. 11 is a view illustrating a state in which a power transmission terminal 56*a* of a first controller 55*a* is exposed. FIG. 12 is a view illustrating a state in which a power reception terminal 56*b* of a second controller 55*b* is exposed. FIG. 13 is a view illustrating a state in which the plurality of controllers 55 (first controller 55*a*, second controller 55*b*, third controller 55*c*) are attached to the rail 69 side by side. In FIGS. 11, 12, and 13, components having the same functions as those of the controller 55 in FIG. 1 are denoted by the same reference numerals as those in FIG. 1, and description thereof will not be repeated unless necessary. In FIGS. 11, 12, and 13, the first controller 55*a*, the second controller 55*b*, and the third controller 55*c* do not operate, and the display on the display unit 20 disappears.

As illustrated in FIG. 11, the first controller 55*a* may be attached to a rail 69 by using the rail holder portion 61. The rail 69 in FIG. 11 extends in a direction orthogonal to the front-rear direction B of the first controller 55*a*. As the rail 69, for example, a DIN rail conforming to a standard defined by the Deutsches Institut fur Normung (DIN) is used. Specifically, the two claw portions of the rail holder portion 61 enter the lower surface of the edge portion of the rail 69, and the rail holder portion 61 sandwiches the rail 69, whereby the first controller 55*a* is attached to the rail 69. The first controller 55*a* attached to the rail 69 is slidable along the rail 69.

In FIG. 11, a front surface of first controller 55*a* is a left side surface. On the left side surface of the first controller 55*a*, the power transmission terminal 56*a* is provided at a position located above the rail 69 when attached to the rail 69. The power transmission terminal 56*a* is covered with a power transmission terminal cover 57*a* when the first controller 55*a* is used alone. When the first controller 55*a* is used together with another controller 55 (such as the second controller 55*b*), the power transmission terminal cover 57*a* is removed, and the power transmission terminal 56*a* is exposed. The power transmission terminal 56*a* outputs power to the other controller 55. Note that the power transmission terminal 56*a* can output not only power but also a signal to another controller 55.

Meanwhile, as illustrated in FIG. 12, the second controller 55*b* different from the first controller 55*a* can also be attached to the rail 69 by using the rail holder portion 61. The rail 69 of FIG. 12 is the same as the rail 69 of FIG. 11, and FIG. 12 illustrates a position away from FIG. 11.

In FIG. 12, a front surface of the second controller 55*b* is a right side surface. On the right side surface of the second controller 55*b*, the power reception terminal 56*b* is provided at a position located above the rail 69 when attached to the rail 69. The power reception terminal 56*b* is covered with a power reception terminal cover 57*b* when the second controller 55*b* is used alone. When the second controller 55*b* is used with another controller 55 (such as the first controller 55*a*), the power reception terminal cover 57*b* is removed to expose the power reception terminal 56*b*. Although not illustrated in FIG. 12, the power transmission terminal 56*a* is also provided on the left side surface of the second controller 55*b*. The power reception terminal 56*b* on the right side surface is provided at a position corresponding to the power transmission terminal 56*a* on the left side surface in the front-rear direction B, that is, just behind the power transmission terminal 56*a*. Power is input to the power reception terminal 56*b* from the other controller 55. Note that not only power but also a signal may be input to the power reception terminal 56*b* from another controller 55.

When the two controllers 55 are arranged side by side on the rail 69, the power transmission terminal 56*a* of one controller 55 and the power reception terminal 56*b* of the other controller 55 are connectable. For example, when the first controller 55*a* and the second controller 55*b* are attached to the rail 69 in a state where the power transmission terminal 56*a* and the power reception terminal 56*b* are exposed, respectively, the first controller 55*a* and the second controller 55*b* slide close to each other on the rail 69 in a state where the one power transmission terminal 56*a* and the other power reception terminal 56*b* face each other, whereby the power transmission terminal 56*a* and the power reception terminal 56*b* are connected. When the power transmission terminal 56*a* of the second controller 55*b* is exposed, the power reception terminal 56*b* of the third controller 55*c* can be further connected to the power transmission terminal 56*a* of the second controller 55*b*. The controller 55 may be provided with both the power reception terminal 56*b* and the external input terminal 12C, or may be provided with either the power reception terminal 56*b* or the external input terminal 12C.

In FIG. 13, the first controller 55*a*, the second controller 55*b*, and the third controller 55*c* are attached to the rail 69 adjacent to each other using the rail holder portion 61. Although the power transmission terminal 56*a* and the power reception terminal 56*b* of each controller 55 are not illustrated in FIG. 13, the power transmission terminal 56*a* of the first controller 55*a* is connected to the power reception terminal 56*b* of the second controller 55*b*. The power transmission terminal 56*a* of second controller 55*b* is connected to the power reception terminal 56*b* of the third controller 55*c*.

In FIG. 13, a fixing unit 68 is disposed in front (right side surface side) of the first controller 55*a*. The fixing unit 68 sandwiches the rail 69 with the lower claw portion. The fixing unit 68 is fixed to the rail 69 by fastening a bolt 68*a*. Since the fixing unit 68 is fixed and disposed on the rail 69, the plurality of controllers 55 are restricted so as not to slide forward from the fixing unit 68. In FIG. 13, the fixing unit

68 is also disposed on the rear side of the third controller 55*c*. The fixing unit 68 on the rear side sandwiches the rail 69 with the lower claw portion, but the bolt 68*a* is not fastened and can slide along the rail 69. When the bolt 68*a* is tightened at a position where the fixing unit 68 on the rear side is aligned with the third controller 55*c*, the plurality of controllers 55 are restricted so as not to slide forward or backward. When another controller 55 is further disposed on the rear side of the third controller 55*c*, the bolt 68*a* of the fixing unit 68 on the rear side is loosened, and the fixing unit 68 on the rear side is slid, so that a space for another controller 55 is secured. The number of controllers 55 between the fixing unit 68 on the front side and the fixing unit 68 on the rear side can be increased by the user as necessary.

Of the plurality of controllers 55 arranged on the rail 69 in FIG. 13, only the first controller 55*a* receives power supply from the outside. Specifically, power from the outside is supplied only to the external input terminal 12C in the connection portion 12 of the first controller 55*a*. Although the connection portion 12 is also provided in the second controller 55*b* and the third controller 55*c*, the second controller 55*b* and the third controller 55*c* perform only signal communication with the outside via the respective connection portions 12.

The first controller 55*a* outputs external power input through the external input terminal 12C to the second controller 55*b* through the power transmission terminal 56*a*. The second controller 55*b* outputs the power from the first controller 55*a* input through the power reception terminal 56*b* to the third controller 55*c* through the power transmission terminal 56*a*.

As described above, the first controller 55*a* to which power is input from the external input terminal 12C and the second controller 55*b* to which power is input from the power reception terminal 56*b* can output power from the power transmission terminal 56*a* to the power reception terminal 56*b* of the other controller 55 (the second controller 55*b* or the third controller 55*c*). As a result, even when a plurality of controllers 55 are used at the same time, the power supply line to the controller 55 may be one, so that the power supply line can be easily routed.

Next, as another example of the embodiment, a level meter 10 for measuring the level of the object 72 will be described with reference to FIG. 14. In the level meter 10 of FIG. 14, the sensor unit 16 can directly communicate with the external control device 90 such as a programmable controller via the communication cable 11. The structure of the sensor unit 16 is similar to that in FIG. 2. Therefore, the level meter 10 of FIG. 14 includes the sensor IC 41 including the transmission unit 43T and the reception unit 43R, the sensor board 42 on which the sensor IC 41 is mounted and which intersects with the measurement axis 40A, and the first housing 16*a* that accommodates them. In the first housing 16*a*, an attachment portion 18 for attachment toward the object 72 and a measurement window 40 that transmits the transmission wave Tx transmitted by the transmission unit 43T are formed. A dielectric lens 48 is disposed in the measurement window 40. Then, the sensor IC 41 included in the level meter 10 in FIG. 14 includes a signal generation unit 82 and a sensor processing unit 88 as in FIGS. 6 and 7. The communication cable 11 of the level meter 10 in FIG. 14 penetrates the first housing 16*a* and is electrically connected to the sensor IC 41.

Figure 14:
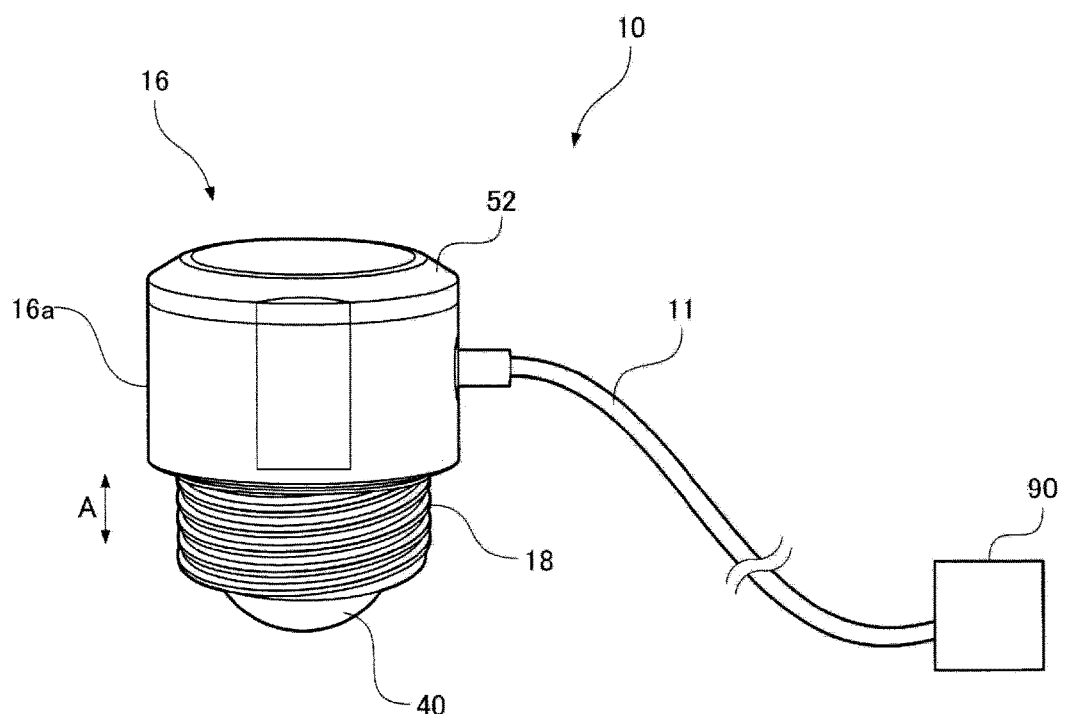
FIG. 14 is a view illustrating a mode in which a sensor unit is connected to an external control device.

In addition, similarly to FIGS. 5A and 5B, the level meter 10 in FIG. 14 may further include a conductive radio wave shaping unit that surrounds a space where the transmission unit 43T and the reception unit 43R are in contact, and forms a waveguide along the measurement axis 40A communicating with the space. In addition, the level meter 10 of FIG. 14 may include a state lamp 52 whose lighting state changes according to a comparison result between the level measured by the sensor processing unit 88 and the set threshold. Similarly to FIG. 5A, the dielectric lens 48 disposed in the measurement window 40 of the level meter 10 in FIG. 14 refracts the transmission wave Tx so that the transmission wave Tx passing through the waveguide travels as a plane wave along the measurement axis 40A. In the sensor board 42, a transmission unit 43T and a reception unit 43R are mounted on a central portion of a surface facing the dielectric lens 48, a state LED 50 serving as a light source of the state lamp 52 is mounted on a rear surface or a peripheral portion thereof, and a transmission window 53 that transmits light from the light source of the state lamp 52 is provided in the first housing 16*a*.

It is preferable that whether the sensor unit 16 is connected to the controller 55 as illustrated in FIG. 1 or directly connected to the external control device 90 as illustrated in FIG. 14 is switched according to the setting. For example, when the level meter 10 is activated, the sensor unit 16 checks a signal transmitted from the communication cable 11 to the sensor unit 16. If the signal transmitted to the sensor unit 16 indicates that the controller 55 is connected to the communication cable 11, the sensor unit 16 operates according to the parameter set by the operation unit 30 of the controller 55.

When the controller 55 is not connected to the communication cable 11, the sensor unit 16 operates according to a device connected to the communication cable 11. For example, when an external control device 90 such as a programmable controller (a device connected to the connection portion 12 of the controller 55 in the form of FIG. 1) is connected to the communication cable 11, the sensor unit 16 operates as the level meter 10 according to a parameter that has already been set (a parameter that has been set at the previous activation).

On the other hand, when a device capable of performing a setting operation on the sensor unit 16, for example, a general-purpose personal computer (PC) is connected to the communication cable 11, the sensor unit 16 may operate by treating the PC in the same manner as the controller 55. For example, setting operation such as setting of a threshold and setting of a color corresponding to a level range is performed from the PC, and the sensor unit 16 measures a level in accordance with the setting operation, and transmits a signal indicating a value of the measured level or a control signal based on a comparison result between the level and each threshold to the PC via the communication cable 11. The PC may display a signal transmitted from the sensor unit 16 on a monitor connected to the PC.

The PC may be used for parameter setting operation. For example, the PC sets the parameter of the level meter 10 by transmitting the parameter regarding the measurement of the level necessary for the next level measurement to the sensor unit 16 via the communication cable 11. Then, after the setting is completed, the power supply of the sensor unit 16 is turned off, and the PC is removed from the communication cable 11. Thereafter, an external control device 90 such as a programmable controller is connected to the communication cable 11. Then, the sensor unit 16 operates as the level meter 10 according to the parameter transmitted from the PC.

In this manner, the sensor unit 16 alone can operate as the level meter 10. The sensor unit 16 is small in size because the display unit 20, the operation unit 30, and the like are not provided. Therefore, if the sensor unit 16 alone operates as the level meter 10, the degree of freedom of the installation place of the level meter 10 becomes very high.

What is claimed is:

1. A level meter for measuring a level of an object, the level meter comprising:

a sensor unit; and a controller connected to the sensor unit via a communication cable, configured to communicate with the sensor unit, and supply power to the sensor unit, wherein the sensor unit includes:

a signal generation unit configured to generate a transmission signal;

a transmission unit transmitting a radio wave according to a transmission signal generated by the signal generation unit;

a first housing containing the transmission unit;

an attachment portion formed in the first housing and configured to be attached toward an object;

a measurement window provided in the first housing and configured to transmit a radio wave transmitted by the transmission unit;

a reception unit receiving a radio wave reflected by the object through the measurement window and generating a reception signal corresponding to the received radio wave; and a sensor processing unit configured to measure the level of the object based on at least the reception signal generated by the reception unit, and the controller includes:

a power supply supplying power to the sensor unit via the communication cable;

a second housing containing the power supply;

a display unit disposed on the second housing, and configured to display according to the level measured by the sensor processing unit; and an operation unit disposed on the second housing, and configured to set a parameter related to measurement of the level.

2. The level meter according to claim 1, wherein the sensor processing unit generates an intermediate frequency signal based on the transmission signal generated by the signal generation unit and the reception signal generated by the reception unit, and measures a level of the object based on the intermediate frequency signal.

3. The level meter according to claim 1, wherein the sensor processing unit measures a level of the object corresponding to a difference between a timing representing a transmission of a radio wave by the transmission unit and a timing representing a reception of the radio wave by the reception unit based on the transmission signal generated by the signal generation unit and the reception signal generated by the reception unit.

4. The level meter according to claim 1, wherein one or more thresholds for dividing a plurality of level ranges are set for the level, and the display unit of the controller displays a bar graph and a gauge indicating the level range determined by the level, a length of the bar graph being expanding and contracting according to a value of the level.

5. The level meter according to claim 1, wherein the controller includes at least one of an external input terminal configured to receive external power and a power reception terminal configured to receive power from another controller, and a power transmission terminal configured to output power to another controller.

6. The level meter according to claim 5, wherein the controller has a rail holder portion for attaching the controller to a rail, and when a first of the controller and a second of the controller are attached to the rail adjacent to each other by using the respective rail holder portion, both the first of the controller receiving the power via the external input terminal and the second of the controller receiving the power via the power reception terminal each provide power from the respective power transmission terminal to the respective power reception terminal of another controller.

7. The level meter according to claim 1, wherein the operation unit receives a setting operation of a threshold for dividing a plurality of level ranges for the level as the parameter related to level measurement, the sensor unit further includes a state lamp indicating a lighting state, the lighting state being changed according to a comparison result between the level measured by the sensor processing unit and the threshold set by the operation unit, and the first housing is provided with a transmission window of the state lamp transmitting light from a light source of the state lamp contained in the first housing.

8. The level meter according to claim 7, wherein the controller further includes a second state lamp indicating a lighting state, the lighting state being changed according to a comparison result between a level measured by the sensor processing unit and the threshold set by the operation unit, and the second housing is provided with a second transmission window of the second state lamp transmitting light from a second light source of the second state lamp contained in the second housing.

9. The level meter according to claim 7, wherein the operation unit further receives a color setting operation corresponding to a plurality of level ranges for the level, and the state lamp emits light in a color corresponding to a level range determined by the level measured by the sensor processing unit.

10. The level meter according to claim 1, wherein the sensor unit further includes:

a dielectric lens disposed in the measurement window, and configured to refract a transmission wave transmitted by the transmission unit such that the transmission wave travels along a measurement axis; and a sensor board contained in the first housing, the sensor board intersecting with the measurement axis, wherein the transmission unit and the reception unit are mounted on the sensor board.

11. The level meter according to claim 10, wherein the attachment portion has a cylindrical shape with the measurement axis as a cylindrical axis, and surrounds a side surface of the dielectric lens.

12. The level meter according to claim 10, wherein the communication cable penetrates the first housing and is electrically connected to the sensor board.

13. The level meter according to claim 10, wherein the operation unit receives a setting operation of a threshold for dividing a plurality of level ranges for the level as the parameter related to measurement of the level, the sensor unit further includes a state lamp indicating a lighting state, the lighting state being changed according to a comparison result between the level measured by the sensor processing unit and the threshold set by the operation unit, in the sensor board, the transmission unit and the reception unit are mounted on a central portion of a surface facing the dielectric lens, and a light source of the state lamp is mounted on a rear surface or a peripheral portion of the surface facing the dielectric lens, and the first housing is provided with a transmission window of the state lamp transmitting light from the light source.

14. The level meter according to claim 13, wherein the first housing has a cylindrical portion having the measurement axis as a cylindrical axis, and a transmission window of the state lamp is provided between a first surface passing through the cylindrical measurement axis and a second surface including a cylindrical side surface.

15. The level meter according to claim 10, wherein the sensor unit further includes:

a conductive radio wave shaping unit disposed around a space where the transmission unit and the reception unit on the sensor board are in contact with each other and forms a waveguide along the measurement axis communicating with the space, and the dielectric lens configured to refract the transmission wave such that the transmission wave transmitted by the transmission unit and passing through the waveguide travels as a plane wave along the measurement axis.

16. The level meter according to claim 15, wherein the waveguide is longer than a half of a wavelength of the transmission wave transmitted by the transmission unit and shorter than a wavelength of the transmission wave in a direction orthogonal to the measurement axis, and the waveguide is longer than a wavelength of the transmission wave transmitted by the transmission unit in a direction along the measurement axis.

17. The level meter according to claim 16, wherein the sensor unit further includes a conductive tapered wall communicating with the waveguide and forming a radio wave path extending from the waveguide toward the dielectric lens in a direction orthogonal to the measurement axis.

18. The level meter according to claim 17, wherein the tapered wall is provided with a radio wave absorber absorbing a radio wave on an inner wall surface.

19. A level meter for measuring a level of an object, the level meter comprising:

a signal generation unit configured to generate a transmission signal;

a transmission unit transmitting a radio wave according to a transmission signal generated by the signal generation unit;

a first housing containing the transmission unit;

an attachment portion formed in the first housing and configured to be attached toward an object;

a measurement window provided in the first housing and configured to transmit a radio wave transmitted by the transmission unit;

a dielectric lens disposed in the measurement window, and configured to refract a radio wave transmitted by the transmission unit such that the radio wave travels along a measurement axis;

a sensor board contained in the first housing, the sensor board intersecting with the measurement axis, wherein the transmission unit and the reception unit are mounted on the sensor board;

a communication cable penetrating the first housing and electrically connected to the sensor board;

a reception unit receiving a radio wave reflected by the object through the measurement window and generating a reception signal corresponding to the received radio wave; and a sensor processing unit configured to measure a level of the object based on at least a reception signal generated by the reception unit.

20. The level meter according to claim 19, further comprising:

a conductive radio wave shaping unit disposed around a space where the transmission unit and the reception unit on the sensor board are in contact with each other and forms a waveguide along the measurement axis communicating with the space; and a state lamp indicating a lighting state, the lighting state being changed according to a comparison result between a level measured by the sensor processing unit and a threshold, wherein the dielectric lens refracts a transmission wave transmitted by the transmission unit and passing through the waveguide such that the transmission wave travels as a plane wave along the measurement axis, in the sensor board, the transmission unit and the reception unit are mounted on a central portion of a surface facing the dielectric lens, and a light source of the state lamp is mounted on a rear surface or a peripheral portion of the surface facing the dielectric lens, and the first housing is provided with a transmission window of the state lamp that transmits light from the light source.

* * * * *